United States Patent
Frazee

(10) Patent No.: US 6,829,596 B1
(45) Date of Patent: Dec. 7, 2004

(54) ACCOUNT/ASSET ACTIVATION DEVICE AND METHOD

(76) Inventor: Steve Frazee, 2204 W. Fox Fire Ct., Highlands Ranch, CO (US) 80126

( * ) Notice: Subject to any disclaimer, the term of this patent is extended or adjusted under 35 U.S.C. 154(b) by 0 days.

(21) Appl. No.: 09/577,733

(22) Filed: May 23, 2000

(51) Int. Cl.$^7$ .................................................. G06F 17/60
(52) U.S. Cl. ........................ 705/66; 705/1; 705/65; 235/380; 379/114; 379/121; 379/124; 379/125; 379/126; 379/127; 379/130; 379/131
(58) Field of Search ........................ 705/1, 66, 65; 379/114.01, 121, 124, 125, 126, 127, 130, 131; 235/380

(56) References Cited

U.S. PATENT DOCUMENTS

| | | | | |
|---|---|---|---|---|
| 5,621,787 A | * | 4/1997 | McKoy et al. | 379/144 |
| 5,696,908 A | * | 12/1997 | Muehlberger et al. | 395/239 |
| 5,699,328 A | * | 12/1997 | Ishizaki et al. | 369/24 |
| 5,714,743 A | * | 2/1998 | Chiba et al. | 235/449 |
| 5,721,768 A | * | 2/1998 | Stimson et al. | 379/114 |
| 5,760,381 A | * | 6/1998 | Stich et al. | 235/380 |
| 5,828,740 A | * | 10/1998 | Khuc et al. | 379/144 |
| 5,868,236 A | * | 2/1999 | Rademacher | 194/217 |
| 5,903,633 A | * | 5/1999 | Lorsch | 379/114 |
| 5,918,909 A | * | 7/1999 | Fiala et al. | 283/61 |
| 5,953,398 A | * | 9/1999 | Hill | 3379/112 |

* cited by examiner

Primary Examiner—James P. Trammell
Assistant Examiner—John Winter

(74) Attorney, Agent, or Firm—Sheridan Ross P.C.

(57) ABSTRACT

An asset/account activation device and method are provided. According to a first preferred method, an asset may be activated by a point of sale device utilizing multiple security mechanisms. Activation codes are sent by secure electronic transmission from an activation host to the activation device. Upon execution of the asset purchase, the activation device dispenses the activation code. Prior thereto, a physical representation of the asset, in the form of a card or the like, has printed thereon an asset ID. To activate the asset, the asset owner contacts a processing device wherein the activation code and asset ID are compared based on time constraints, retailer location constraints and other constraints. Other security checks may be incorporated to include velocity checks. The apparatus of the invention includes an activation host, an activation device, a processing device or VRU, and an activation database. The activation database stores multiple data elements regarding accounts corresponding to specified assets, along with other system data such as retailer information, and security data. The activation host includes a central processor or computer which is able to manipulate the data to control the flow of data. The activation device is installed at a distributor location to distribute activation IDs. Asset activation occurs by interaction of the asset owner with the processing device which makes an activation approval request to the activation host. The activation host approves/disapproves the activation request with the asset host actually activating the asset. The asset host may communicate with the distributor's computer system to create a billing record or tracking report. A second preferred method is disclosed for distributing activation codes through the use of preprinted paper based sheets of activation IDs. Activation of assets in the second method is achieved in the same way as in the first method.

34 Claims, 12 Drawing Sheets

| Field Name | Type | Bytes | Description |
|---|---|---|---|
| Datagram Length | Binary | 1 | The number of bytes in the datagram including this length byte. The maximum datagram length is 254 bytes but may be further limited by the wireless paging protocol. |
| Code Count | Binary | 1 | The number of Activation Codes included in this datagram. The maximum number is 100. |
| Activation Code 1 | Binary | 2 | The first Activation Code. |
| Activation Code 2 | Binary | 2 | The second Activation Code. |
| Activation Code n | Binary | 2 | The nth Activation Code. |
| Command Count | Binary | 1 | The number of Device Commands included in this datagram. A variable number of Device Commands of variable lengths can be included in the datagram limited only by the available bytes of the datagram. |
| Command 1 Length | Binary | 1 | The number of bytes in the first command string including this count. |
| Command 1 Flag | Binary | 1 | The command type flag of the first command (see Table 2). |
| Command 1 Data | Var | Var | Each Device Command has its own associated data that is delivered to the Activation Device. |
| Command n Length | Binary | 1 | The number of bytes in the nth Device Command. |
| Command n Flag | Binary | 1 | The command type of the nth command. |
| Command n Data | Var | Var | Data associated with the nth command. |
| Check Digits | Binary | 2 | A two byte checksum on the datagram |

Fig 10

| Command Flag | Command Name | Description | One-way | Two-way |
|---|---|---|---|---|
| 1 | Clear | Clears memory and resets the Activation Device to its factory settings. This command DOES NOT delete the encryption key. | YES | YES |
| 2 | Lock | Disables the Activation Device. | YES | YES |
| 3 | Unlock | Enables the Activation Device if it has previously received a LOCK command. | YES | YES |
| 4 | OS Update | Signals that new firmware is being sent to the Activation Device. | NO | YES |
| 5 | Limit | Sets the number of Activation IDs that can be dispensed in a given time frame. | YES | YES |
| 6 | Status | Requests the Activation Device respond with its status. | NO | YES |
| 7 | Dump | Requests the Activation Device respond with a dump of the Activation Codes in memory. | NO | YES |

Fig 11

| Field Name | *Activation Code* | *Time Date* | *Check Digit* |
|---|---|---|---|
| Numeric Characters | 5 | 4 | 1 |
| Description | Five numeric characters ranging from 00000 to 99999. | Four numeric characters representing the number of hours which have elapsed since the beginning of the year. The data range is from 0001 to 8784. For example, April 5 3:30PM is indicated by 2296. | This one digit check sum is calculated using the other nine digits of the Activation ID. |

Fig 12

Dispense date and time: 3:30 P.M April 5

Calculation:

| Month | Days | Hours |
|---|---|---|
| Jan | 31 | 744 |
| Feb | 29 | 696 |
| Mar | 31 | 744 |
| Apr | 4 | 96 |
| Hours | 15 | 15 |
| Minutes | 30 | 1 |
| Elapsed Hours | | 2296 |

Fig 13

**\*\*\*\* IMPORTANT MESSAGE \*\*\*\***

Immediately upon receiving this sheet call 800.xxx.xxxx to enable it. There is NO charge to enable this sheet. Once this sheet is enabled, previous sheets having Activation IDs which have not been dispensed will be disabled. Retain each spent sheet as a log for your records.

SHEET TRACKING NUMBER: 13568975

INSTRUCTIONS:

Do not remove an Activation label until the sale of the prepaid card is complete. Once the sale is complete, remove a single ID label and affix it to the prepaid card. Instruct the customer that they will need this Activation ID to activate the card. Show the customer the 800 number on the card and tell them to call this number and provide the Activation ID and PIN to activate the card.

Log the time and date of the sale as well as the identification of the sales clerk and the value of the card sold. This log is your record of sale.

| ID Label | Activation ID | Time | Date | Clerk | Card Value |
|---|---|---|---|---|---|
| 123456789x | 123456789x | | | | |
| 223456789x | 223456789x | | | | |
| 323456789x | 323456789x | | | | |

Fig 14

ACCOUNT/ASSET ACTIVATION DEVICE AND METHOD

TECHNICAL FIELD

This invention relates to a device and method for providing and activating an account or asset, and more particularly, to a device and method for activating an account or asset by secure means, the account or asset only being of value after activation and distribution to the end user.

BACKGROUND ART

Various methods and systems exist for the sale and use of prepaid telephone calls. One example is U.S. Pat. No. 4,706,275, which allows for prepayment of telephone calls, wherein credit information and a special code for a specific account are stored in memory in special exchanges and then the amount of prepaid minutes in a specific account are debited as a call is made, using the special code. Such systems are well known in the telecommunications industry, and the special codes are typically referred to as personal identification numbers or PINS. PINS may be distributed to an end user in various forms such as a label on a phone card, or printing on a phone card. Typically, a phone card company sells a plurality of phone cards with distinct PINS on each of the phone cards to a retailer, a machine operator, or promotional advertiser. These phone cards are typically resold for long distance services at retail value, or may be given away as promotional items. Each PIN appearing on an individual phone card corresponds to a specific account that is credited with a predetermined number of telephone call units, such as minutes. In some systems, the PIN is actually the account number, which corresponds to a control code that is issued with and identifies a particular phone card. Thus, each PIN may be linked to a predetermined number of minutes of long distance telephone time and to a control code. There are significant disadvantages with providing live or active telephone cards. One major drawback is the fact that the cards have value prior to distribution, and can be stolen. Another drawback is that retailers must hold such assets as inventory, creating problems for inventory control as well as concerns for security over storing unsold cards.

One alternative to having the retailer prepay for the cards is to implement point of sale activation, known in the industry as "POSA." Point of sale activation involves distributing inactive phone cards to a retailer, then having the retailer activate each individual card as it is paid for by the customer. One example of this POSA system is disclosed in U.S. Pat. No. 5,903,633. As disclosed therein, a phone card is provided which has a magnetic strip for encoding prepaid phone card information adapted for reading by a point of sale terminal. At the time the phone card is to be sold or otherwise transferred to an owner, the card may be read through the terminal which communicates with a central computer. The central computer compares information encoded on the card with information stored in a central database and with information from the point of sale terminal to verify that the card is being rightfully sold. The central computer may then authorize or deny activation of the card. Upon activation, the central computer or an invoicing computer communicating with the central computer may then prepare an invoice or automatically debit the retailer's bank account.

Another example of activating an account involving prepaid phone cards and the like include U.S. Pat. No. 5,918,909. This reference discloses a method of activating a metered account that is associated with a PIN, where the PIN is fixed to a card and the metered account is activated at the time of sale of the card. The card utilizes a magnetic data encoded strip, and a PIN printed thereon. The magnetic data encoded strip is encoded with a control number that is associated with the metered account. When the card is purchased, the control number is read from the data encoded strip, and the metered account is activated.

An example of a long distance telephone service system involving prepaid accounts includes U.S. Pat. No. 5,953,398. This reference discloses a system which provides for accounting and flexible, customizable control of long distance telephone usage by customers, especially prepaid long distance service customers. The system maintains a set of operating parameters corresponding to each access number, and a database of user accounts or card numbers along with a set of card processing parameters associated with each card number. Both the operating parameters and the processing parameters are applied in completing a long distance call. New accounts and recharging of existing prepaid accounts is accomplished automatically from remote locations.

Another example of a prepaid card system involving activation of an asset includes U.S. Pat. No. 5,721,768. This reference discloses a prepaid card system enabling customers to make purchases using an authorized card. The system includes four main functional components: a plurality of cards, a host computer, a plurality of on-site activation terminals, and a main processor. Each of the cards has a security number associated therewith. Each card is formed of a suitable material and may include the security number in clear text under a suitable black out. The main management and processing of the system is effected by the host computer. The host includes a database for storing security numbers corresponding to each of the authorized cards. The data terminals are remote from the host computer and communicate therewith for transmitting data between the terminals and the host computer. The main processor is controlled by the host computer for enabling customer purchases using authorized cards.

U.S. Pat. No. 5,696,908 is an example of a method and apparatus used for handling a telephone debit card. This reference discloses a method whereby telephone debit cards are automatically vended through a microprocessor controlled vending machine which permits card payment in cash and credit. The customer may select a desired telephone card value and a desired telecommunications carrier. Prepaid and printed cards are dispensed. Optionally, printed receipts are dispensed including an access code and prepaid value. The vending machine generates real time communications with an electronics funds clearing house for customer validity and funds approval. After electronic transfer of funds to the machine, the telephone debit card is dispensed and funds are electronically transferred to the selected telecommunications carrier via real time communications with the carrier chosen for electronic transfer of the card value, thus permitting immediate use of the telephone card by the customer.

Yet another example of a method or device involving activation of an asset includes U.S. Pat. No. 5,868,236. This reference discloses a phone card vending machine which has a secure locking cabinet, a card dispenser, a bill accepter or similar cash accepter, a printer for printing slip receipts containing an activated PIN, and a controller board within the cabinet which controls the printing of activated PINs. The card dispenser contains a supply of inactivate or zero value telephone cards. The controller board has a PIN memory that stores PIN numbers for each of several amounts of long distance calling time. The customer purchases a card by inserting currency, and making a selection on a keypad on the cabinet. At the time the card is dispensed, the printer prints and dispenses a receipt showing the value of the purchase price, including any taxes, the amount of long distance service time purchased, and the PIN number. The vending machine can replenish its stock of activated PIN numbers by modem from a remote location.

While each of the foregoing inventions may be adequate for their intended purpose, there are certain disadvantages associated with each, and none of which alone or in combination provide the advantages hereinafter described with reference to the claimed invention herein.

DISCLOSURE OF THE INVENTION

In accordance with this invention, a method and apparatus are provided for activation of a desired asset or account. According to the invention, secure means are provided to activate the asset or account and thus, only be of value after the asset is activated and distributed to the consumer or end user. The security features of this invention involve the distribution of activation codes which are matched with each physical representation or manifestation of the asset, such as a prepaid phone card or the like. The physical representation of the asset may be a plastic or paper card, receipt, coupon, or some other carrier which may have the activation code printed thereon or attached thereto.

The physical representation of the asset, i.e., the card, is stored or merchandised in an inactivate state meaning that the asset may not be used until activated. Distribution, merchandising and transportation of the physical representation of the asset in an inactivate state greatly reduces the opportunity for theft or fraud.

Approval for activation of the asset is accomplished by communicating with an activation host computer system which stores data through an activation database on each asset. Communication with the activation host computer is preferably completed by the end user, or may be completed by the entity, such as a retailer, that distributed the card to the end user. In order to fulfill a request to activate the asset, at least two pieces of information must be communicated to the activation host computer system. In the preferred embodiment, these pieces of information include an asset ID, and the activation code. The asset ID may also be referred to as a PIN number or simply a PIN. The PIN number is typically pre-printed on the card, and corresponds to an account established on the asset provider's computer system. The activation code may be one element in an activation identification sequence, or activation ID. The activation ID may further include a time/date stamp and a check sum digit allowing incorporation of additional security features. Activation codes are stored in a secure manner within the activation host computer system, and within an activation device once it has received a set of activation codes from the activation host computer. These activation codes are stored in a secure manner separate from the cards or any other physical representation of the assets.

As an example, prepaid phone cards that are sold in retail establishments provide end users access to a preset number of long distance network calling minutes. Under the method and apparatus of this invention, prepaid phone cards can be merchandised in an inactive state and thus be of little actual value prior to activation. At the time of purchase, the retail clerk in the retail store would affix an activation ID to the prepaid phone card by inserting the card in an activation device which would dispense a unique activation code, or an activation ID which would include an activation code. The end user would then communicate with the activation host computer system, for example by a voice response unit (VRU) prior to placing the first call. The VRU would prompt the end user to identify the prepaid phone card that was purchased by recitation of the PEN/asset ID and activation ID. Upon receiving this information, the activation host computer processes a variety security checks including a check to ensure that the PIN and activation ID were issued to the same retailer, and a check to ensure that the retailer has not exceeded a typical number of activation ID dispenses, among others. If the submitted information passes the security checks, then the activation host computer communicates through the VRU that the asset has been approved for activation, and is valid. The end user now has access to a value represented by the prepaid phone card. Thus, the method and apparatus of the invention enable distribution and merchandising of assets in an inactive state so as to provide a secure mechanism to transfer, distribute or sell the assets without the fear of theft or fraud. Additionally, the method and apparatus provide means to track when and where assets were sold or distributed.

BRIEF DESCRIPTION OF THE DRAWINGS

FIG. 10 is a table illustrating a datagram that may be sent to the activation devices from the activation host, the datagram including activation codes, device commands, and other data;

FIG. 11 is a table of device commands which may be sent from the activation host to the activation device encapsulated in the datagram;

FIG. 12 is a table explaining the components of an activation ID, namely, the activation code, timedate information, and a check digit;

FIG. 13 illustrates a sample calculation for the timedate information within an activation code; and FIG. 14 illustrates a sample sheet for issuing and tracking assets according to another preferred embodiment of the method of this invention.

DETAILED DESCRIPTION OF THE DRAWINGS

Figure 1:
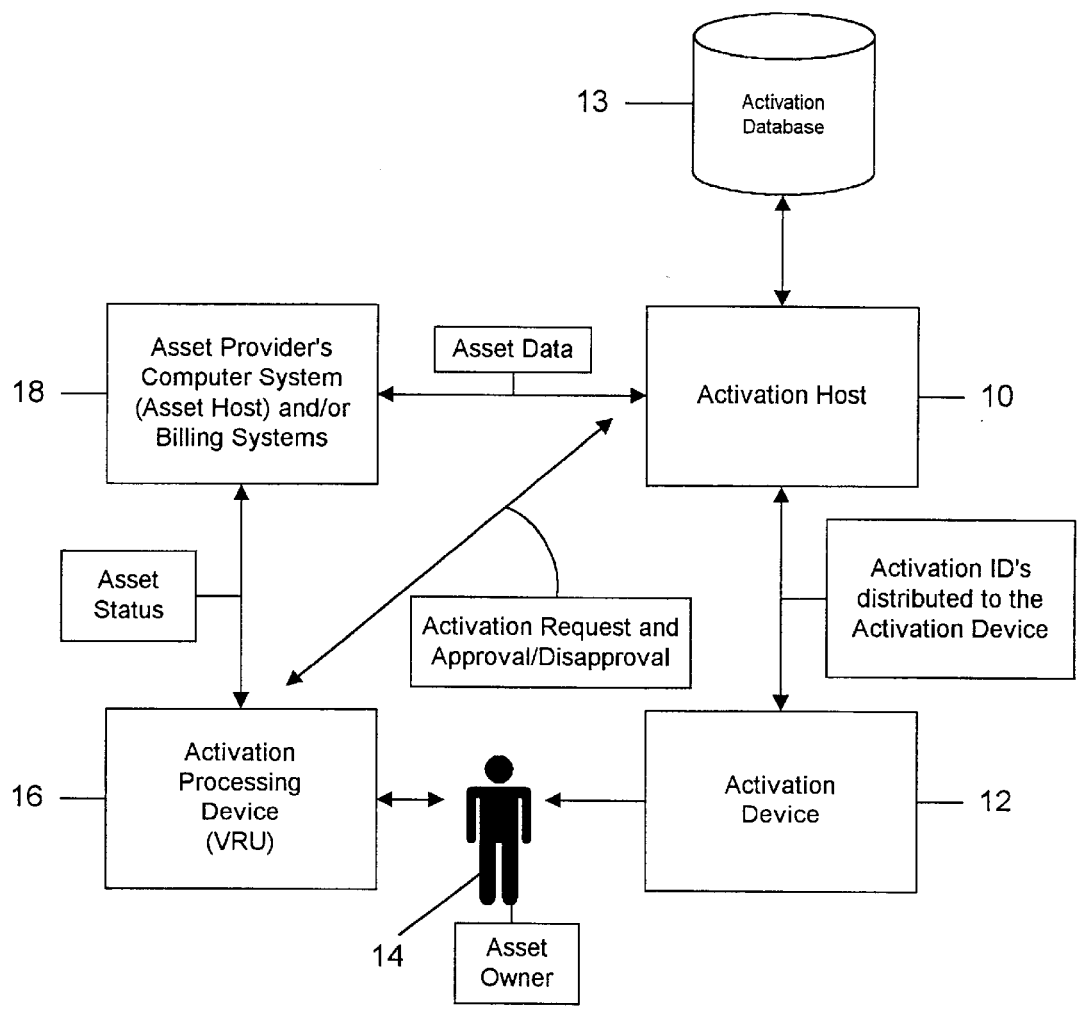
FIG. 1 is a simplified schematic diagram illustrating the basic method of this invention, and the elements comprising the device or apparatus of this invention.

FIG. 1 illustrates the basic components in the apparatus of this invention, along with the relationships of such components. The first preferred method of the invention begins with an entity offering to sell an asset, such as a prepaid telecommunication service. This entity may be referred to as the asset provider or simply provider. The provider offers the asset to a distributor such as a retailer who will contract with the provider to provide the provider's services to a consumer or end user. The retailer typically pays wholesale prices for the assets, with the intent to offer the assets to the consumer at retail prices. The retail market is used as an example within the method of this invention; however, it shall be understood that the assets manipulated within the method of this invention can be applied to other markets where the asset may be offered to the consumer through other distribution channels.

Prior to contracting, the provider may verify that the retailer is of substance and passes any needed risk management assessment. Once approved, the provider can begin the process of allocating prepaid accounts and activation codes to the retailer. The provider uses a centralized computer system, shown as the asset provider's computer system 18 for manipulating accounts and data. The asset provider's computer system 18 exchanges data with an activation host computer 10. The activation host 10 processes activation requests and security checks, and creates and distributes activation codes to activation device 12. An activation database 13 is maintained, which communicates with the activation host 10. The activation database stores data regarding asset IDs, activation codes, and other data relating to the assets. Data may also be recorded concerning each retailer, including information such as various store locations, the number of checkout counters per store, and other data which identifies the retailer's operation. This retailer data may be also recorded and updated through the asset provider's own computer system 18. As further explained below, activation codes are distributed to individual activation devices 12 which are installed at the various retailer locations. Distribution of the activation codes is conducted electronically. If a wireless network is being used to distribute activation codes, then each store location is verified to be within the coverage area of the wireless network. Based upon the details of the relationship and needs of the particular retailer, the provider allocates a group of prepaid accounts from its database of accounts in the provider's computer system for each of the retailer's stores. This group of prepaid accounts may correspond to any type of desired asset, such as prepaid calling cards, gift certificates, or other assets. The prepaid accounts may be of varying values, measured in dollars, minutes, or other units. Each account is identified by the PIN/asset ID that has been assigned to each particular account.

Once the group of accounts is allocated to each retailer and each store location, the physical representations of the assets, usually plastic or paper cards, are distributed to the retailers and merchandised at the retail locations. Each of the plastic or paper cards representing the assets has preprinted or otherwise applied thereon the asset ID or PIN which corresponds to the account identified on the asset provider's computer system 18. The activation database 13 stores data regarding the group of cards distributed to each particular retailer, and the PIN/asset ID numbers which are associated with each card distributed to a particular retailer.

Each retail site requires one or more activation devices 12 so that activation codes may be distributed. Activation devices 12 are prepared for deployment to the retail locations, and identifying information relating to each of the distributed devices is entered in the activation database 13. When the activation database 13 has been updated with all of the relevant information regarding distributed activation devices, the activation devices can then be injected with encryption keys and any other required data or parameters allowing them to be ready for operation once installed at the retailer locations.

The retailer may install the activation devices 12 in accordance with the steps outlined in FIG. 4, discussed below. The retailer installs the activation devices 12 in accordance with provided instructions and then completes an installation survey, returning it to the provider. The provider, or an entity working on the provider's behalf inputs the survey information from the installation survey into the activation database 13. The survey includes information regarding a description of where each activation device is located within each retail location, and other information such as the anticipated number of activations per day per activation device. Providing the location of each activation device and then recording that data at the activation database 13 allows the activation host 10 to create reports which may be generated about each individual activation device 12 in a way that is meaningful to the retailer.

Once the activation host 10 is informed that a new activation device 12 has been installed at a retail site, the activation host 10 generates a group of activation codes for distribution to the installed activation devices. The activation host 10 may use one of many methods to generate activation codes, such as a pseudo random number-based algorithm, to ensure that groups of activation codes assigned to any given retailer are not based on any discernable numeric sequence. This adds system security in that unauthorized system access will not result in a computer hacker being able to generate false activation codes. The number of activation codes distributed to any given activation device is governed by a variety of parameters including the cost of data distribution, the risk assessment rating of the retailer, and velocity settings (discussed below) for the specific device. The activation host 10 sends activation codes to each activation device 12 through datagrams that are encrypted prior to distribution to the activation devices. A datagram (FIG. 10 discussed below) can include both activation codes and/or device commands (FIG. 11 discussed below). Device commands are instructions that are sent from the activation host 10 to the activation devices 12.

Datagrams are encrypted by the activation host 10 and decrypted by the activation device 12 to ensure security that the activation codes are not stolen during the distribution process. The activation host 10 through the activation database 13 maintains a database of encryption keys that correspond to the encryption keys injected into each activation device prior to deployment to the retail locations. Each datagram is encrypted prior to distribution.

The distribution of activation codes and device commands can be achieved through a variety of transportation mechanisms and networks, either public or private. The preferred embodiment utilizes a one-way paging network during off-peak hours as a cost effective mechanism to deliver data to the activation devices 12. The activation host 10 queues datagrams for delivery to the activation devices 12 at set time periods during off-peak hours. After an activation device 12 receives an encrypted datagram, it decrypts the datagram using the encryption key and stores the activation codes. The preferred embodiment implements a small and cost effective stand alone activation device 12 that stores activation codes in RAM until they are retrieved dispensed as part of corresponding activation IDs.

One method of encryption can be simply to use a single master key to encrypt and decrypt datagrams. Thus, each device may have its own sixteen-character encryption key. Other data encryption protocols can include derived unique key per transaction (DUKPT), as well as other well known encryption methods as understood by those skilled in the art.

The asset owner 14, otherwise known as the consumer or end user, will purchase the asset from the retailer. In order to be able to use the asset, the asset owner 14 must activate the same. In the preferred embodiment, this is accomplished by the asset owner 14 contacting an activation processing device 16, such as a VRU. Typically, a VRU is an automated response device within a computer system which communicates activation requests from the asset owner 14 back to the activation host 10.

While the activation ID can be any unique identifying ID for each PIN or asset ID, the preferred embodiment uses a ten digit number which is comprised of an activation code of five digits, a four digit timedate stamp, and a one digit check sum. As discussed above, the activation host 10 tracks which activation codes have been delivered to each specific activation device 12. This information is also stored in the activation database 13 where it further matches which activation devices 12 and retail sites have received specific activation codes. A total of 99,999 unique five digit activation codes are available with a five digit character string. Based upon the number of activation devices used, it may become necessary at some point for the issuance of duplicate activation codes to the field. This will not create a problem as each activation code will be associated with a specific retail site allowing the method to support multiple sites having possibly identical activation codes in inventory. Thus, as long as the activation codes are not duplicated among the same retail locations, the limited number of five digit activation codes is not a problem. Also, the activation host tracks how many activation codes are in current inventory for any specific activation device, and replenishes the inventory periodically as dictated by parameters customized for each retail site. For example, each activation device can be tracked to determine the number of cards which have been issued per day or per week. Based upon this historical data, the activation host may automatically replenish the inventory. Alternatively, in a two-way paging network as discussed below, the activation device itself may be able to query the activation host for issuance of additional activation codes, assuming that such a request does not violate a pre-established velocity check.

The asset provider's computer system 18 may be a sufficiently powered personal computer with host operating software to support the data flow described herein. This computer system 18, as a personal computer, includes a microprocessing device, and data storage capability utilizing any well known commercial databases such as ORACLE, SQL Server, and the like. A database may be built for the particular assets to be distributed and activated within the apparatus of the invention. Separate databases can be built regarding retailer information, activation codes, and any other necessary data to support the method of this invention. The activation host computer 10 may also be a sufficiently powered personal computer having its own microprocessor, and data storage capability, as with the asset provider's computer system 18. The activation database 13 has been separately identified; however, it shall be understood that the activation host may have additional databases to support the method of this invention. The activation processing device can be its own stand alone, sufficiently powered computer system including its own microprocessor and data storage capability. Alternatively, the activation processing device can simply be operating software which is run by the asset provider's computer system. Although the asset provider's computer system 18, the activation host 10, and the activation processing device 16 have been illustrated as separate, and perhaps remotely located components, it shall be understood that each of these elements may be co-located enhancing the ability to maintain and troubleshoot each of these components. A system administrator can be assigned with responsibility to ensure overall system functioning, and can be made available to each retailer or distributor which has installed at its location an activation device 12.

Figure 2:
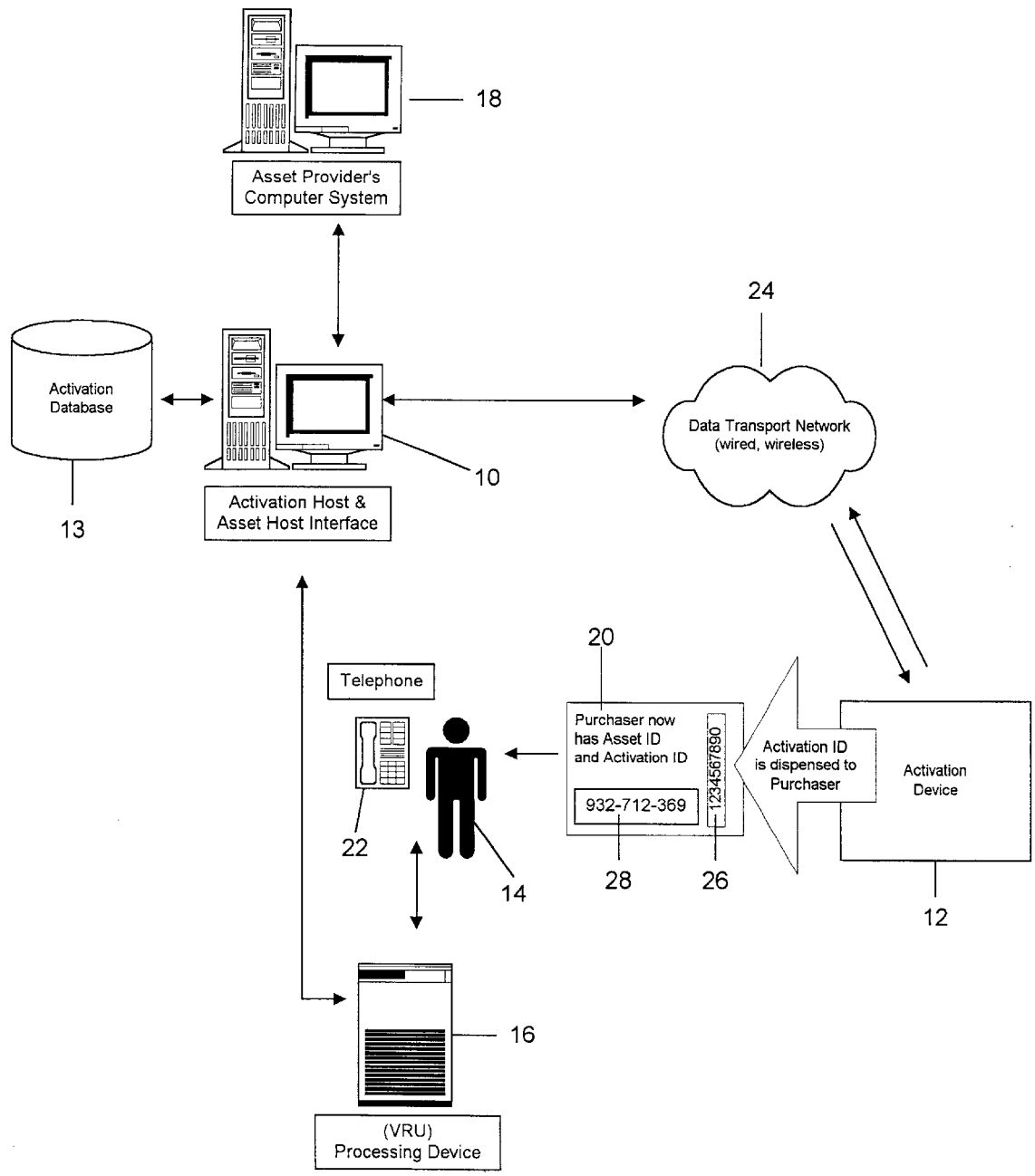
FIG. 2 is a more detailed schematic diagram of the method and apparatus of this invention.

Now referring to FIG. 2, the first preferred method of the invention provides an activation host 10 which derives its data regarding the assets through the activation database 13. Activation codes and device commands are submitted for broadcast to specific activation devices 12 by a desired data transportation medium, such as a wired or wireless data transportation network 24. Some activation devices 12 may have the capability to communicate back to the activation host 10, for example, to inform the activation host 10 when an activation ID has been dispensed by the activation device 12. This ability to communicate back to the activation host will be present in a two-way paging network, or in other similar two-way networks. The activation codes are transmitted by the activation host 10 in encrypted form, and then are decrypted by each individual activation device 12. The activation codes are stored locally in each activation device 12 until dispensed as a result of a purchase transaction, or promotional give away. The cards representing the particular asset have preprinted thereon the asset ID which corresponds to the account number stored in the asset provider's computer system 18 and activation database 13. Once the purchase transaction/give-away takes place at the retailer location, the retail clerk inserts a card 20 into the activation device 12 and the activation device 12 dispenses an activation ID 26. The card 20 containing the activation ID 26 is then given to the asset owner/consumer 14. As also shown in FIG. 2, the asset ID 28 appears on the card 20, and can be any identifying sequence of numbers or letters. To activate the asset, the asset owner 14 interacts with the processing device/VRU 16, that prompts the owner 14 for both the activation ID 26 and the asset ID 28. If the asset owner 14 utilizes a telephone 22 to interact with the VRU processing device 16, the activation ID 26 and asset ID 28 can be entered either by voice, or by entering the IDs via the keypad on the telephone. It should be also understood that the VRU 16 could be an interactive website, or other automated means which has the capability to receive the activation ID and asset ID, and transfer the same information to the activation host 10 for verification of the activation request. As briefly discussed above, the activation ID and the asset ID/PIN are analyzed by the activation host. If the activation ID matches an appropriate asset ID based upon retailer location and other parameters, as discussed further below, then the activation host issues a message back through the processing device 16 indicating that the asset has been approved for activation. At this time, the asset owner 14 may then use the asset for its intended purpose. Simultaneous with issuing an approval message, the activation host 10 may communicate a datagram or message to the provider's computer system 18 indicating that the asset should be marked as activated. The asset provider's computer system 18 then activates the asset which triggers a billable from the asset provider to the retailer. This billable itself may be in the form of a datagram sent electronically by the asset provider's computer system to the retailer's computer system (not shown). Thus, it can be seen that the retailer is not actually billed for the asset until the asset has been sold and activated. The datagram generated by the asset provider's computer system 18 regarding the billing can be formatted as necessary for acceptance by the retailer's computer system.

Figure 3:
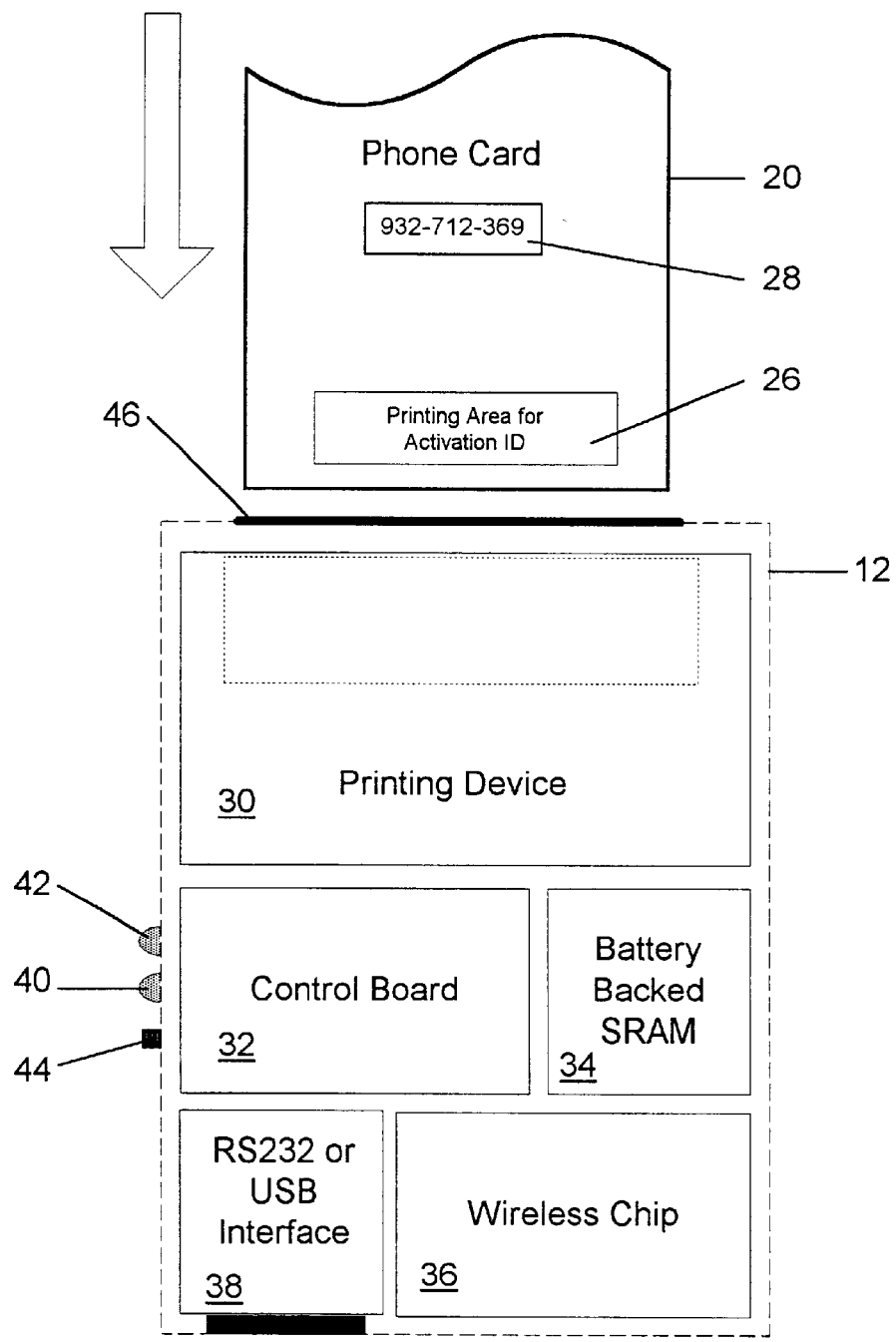
FIG. 3 is a schematic diagram illustrating the components of a remote activation device.

FIG. 3 illustrates a remote activation device 12. The device may be powered by a transformer (not shown) which plugs into a standard power outlet. A printing device 30 is mounted within the device, and prints the activation ID on a card 20 which is inserted within the device. A control board 32 is provided which controls the operation of the activation device. The control board 32 contains various logic microprocessor circuitry to incorporate the functionality of the method described above. A one- or two-way wireless paging chip 36 enables the activation device to receive, or receive and transmit datagrams from the activation host. Depending upon costs and other factors, a one-way wireless paging chip is all that is necessary to incorporate the method of this invention. A pressure sensitive switch, limit switch, or an externally activated manual switch (not shown) is tripped to indicate to the control board 32 that a request is being made to dispense an activation ID. The act of inserting the card 20 can also trip the switch. Thus, when an activation ID is needed, the clerk at the retail site simply inserts the prepaid card into the device, and then the activation ID is printed on the card. The control board 32 in response to tripping of the switch retrieves the next queued activation code in the RAM 34, queries its clock mechanism within the control logic, and calculates the luhn digit to form the ten digit activation ID which is then forwarded to the printing device 30. The RAM 34 may be battery backed in the event of power failure. The luhn digit is discussed further below. An RS232 or USB port 38 gives technicians a means to interact directly with the control board 32 to reset the activation device, inject encryption keys, run system tests, update any software running the control logic in the board 32, as well as to preload activation codes. The status of the activation device 12 may be communicated to the operator or user via a simple set of dual colored indicator lights 40 and 42. The green light 40 indicates that the activation device has activation codes stored in RAM 34, and that the device is ready for operation. Red light 42 indicates a malfunction in the machine, or that there are no activation codes in RAM 34, or that the device has been locked out by command from the activation host 10. Also shown is the power connection 44 which connects to the power providing transformer. The control board 32 also decrypts and processes the datagrams from the activation host 10, storing the activation codes in the battery backed RAM 34, and complying with any device commands that were transmitted as part of the datagram.

Figure 4:
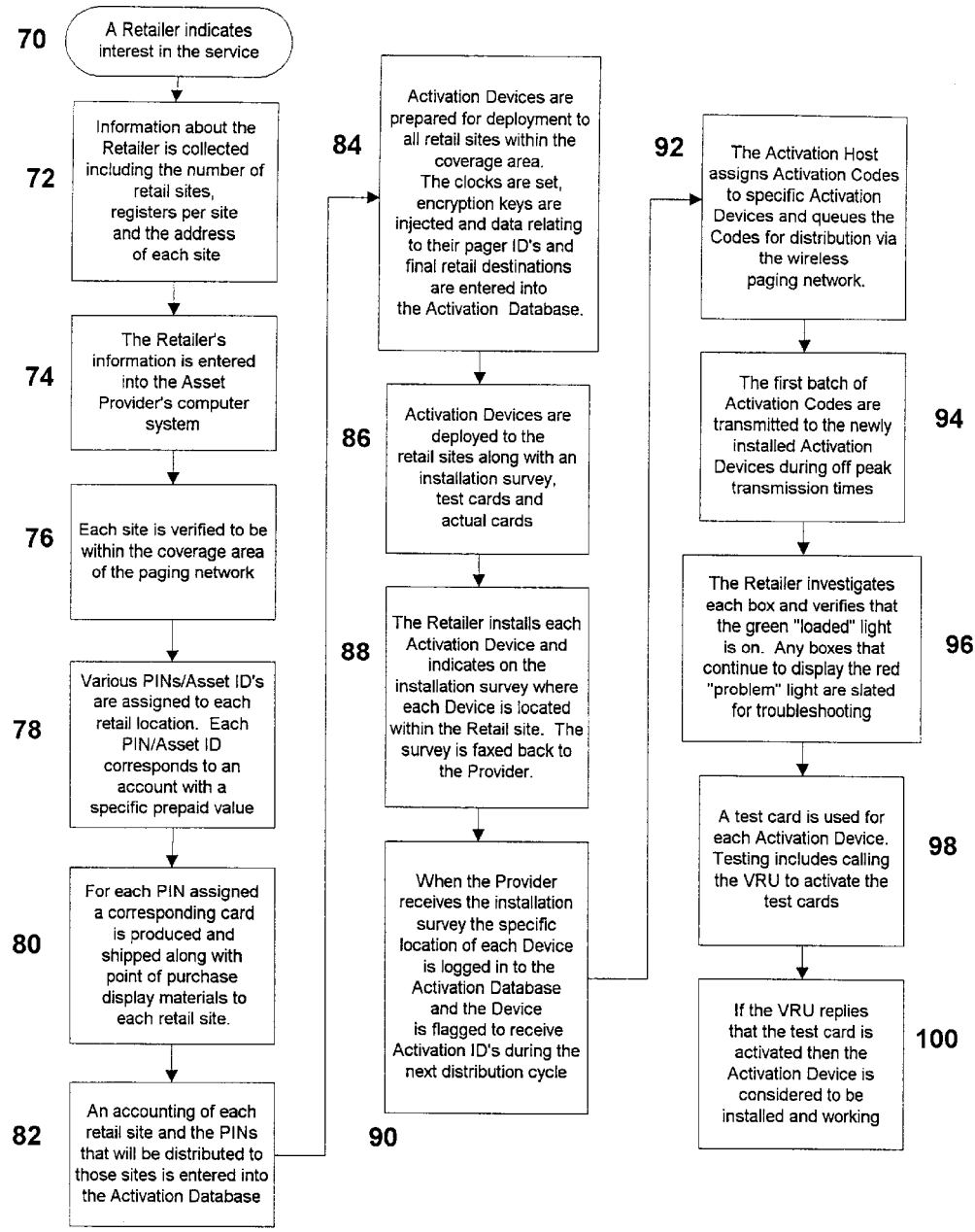
FIG. 4 is a flow diagram illustrating the steps in distributing and testing remote activation devices.

FIG. 4 illustrates a summary of the activities which occur during distribution of activation devices. As shown at Step 70, a retailer indicates interest in the service. At Step 72, the information about the retailer is collected including the number of retail sites, registers per site and the address of each site. At Step 74, the retailer's information is entered into the asset provider's computer system. Each retail site is verified to be within the coverage area of the paging network, at Step 76. At Step 78, various PINs/asset IDs are assigned to each retail location, and printed or otherwise affixed to physical representations of the assets, such as cards. Each PIN/asset ID corresponds to an account with a specific prepaid value, as recorded in the asset provider's computer system and the activation database. At Step 80, for each PIN assigned, a corresponding card is produced and shipped along with any needed point of display materials at the retail site. An accounting of each retail site and the asset IDs that will be distributed to those sites are stored in the activation database, at Step 82. At Step 84, activation devices are prepared for deployment to all retail sites within the coverage area. The activation devices are prepared by setting their clocks, entering encryption keys and other data relating to their pager identifications within a communications network. Final retail destinations are also entered into the activation database. At Step 86, the activation devices are deployed to the retail sites along with an installation survey, test cards and actual cards with preprinted asset IDs/PINs. At Step 88, the retailer installs each activation device and indicates on the installation survey where the device is located within the retail site. The survey is then returned to the provider. At Step 90, the provider receives the installation survey and the location of each device is logged into the activation database. The device is flagged to receive activation IDs during the next distribution cycle. Distribution cycles can be daily, weekly, or any other appropriate time period depending upon the amount of activity at a particular retail site. At Step 92, the activation host assigns activation codes to specific activation devices and queues the codes for distribution via the wireless paging network. At Step 94, the first batch of activation codes are transmitted to the newly installed activation devices. At Step 96, the retailer investigates each device and verifies that the green loaded light is on. This green loaded light corresponds to light 40, shown in FIG. 3. Any devices that continue to display the red problem light 42 (also of FIG. 3) are slated for troubleshooting. At Step 98, a test card is used for each activation device. Testing includes calling the VRU to activate the test cards. At Step 100, if the VRU replies that the test cards are activated, then the activation devices are considered to be installed and fully functioning.

Figure 5:
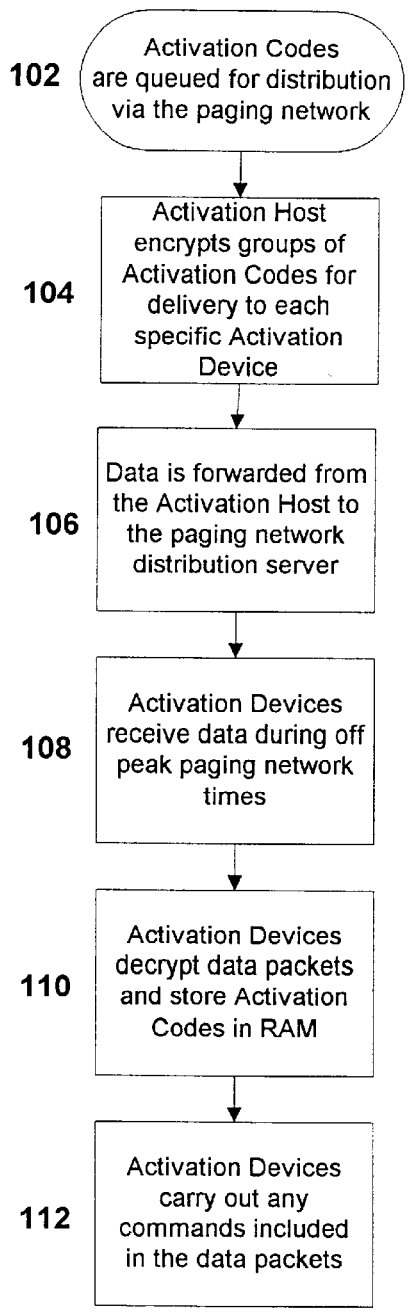
FIG. 5 is a flow diagram illustrating the steps involved in the distribution of activation codes from the activation host to the activation devices.

FIG. 5 illustrates the basic steps in activation code distribution. As shown at Step 102, activation codes are queued for distribution via the paging network. At Step 104, the activation host encrypts groups of activation codes for delivery to specified activation devices. At Step 106, data in the form of datagrams is forwarded from the activation host to a paging network distribution server. At Step 108, activation devices receive the data preferably during off-peak paging network times. At Step 110, activation devices decrypt the data packets or datagrams and store the activation codes in RAM. At Step 112, the activation devices carry out any device commands included in the datagrams.

Figure 6:
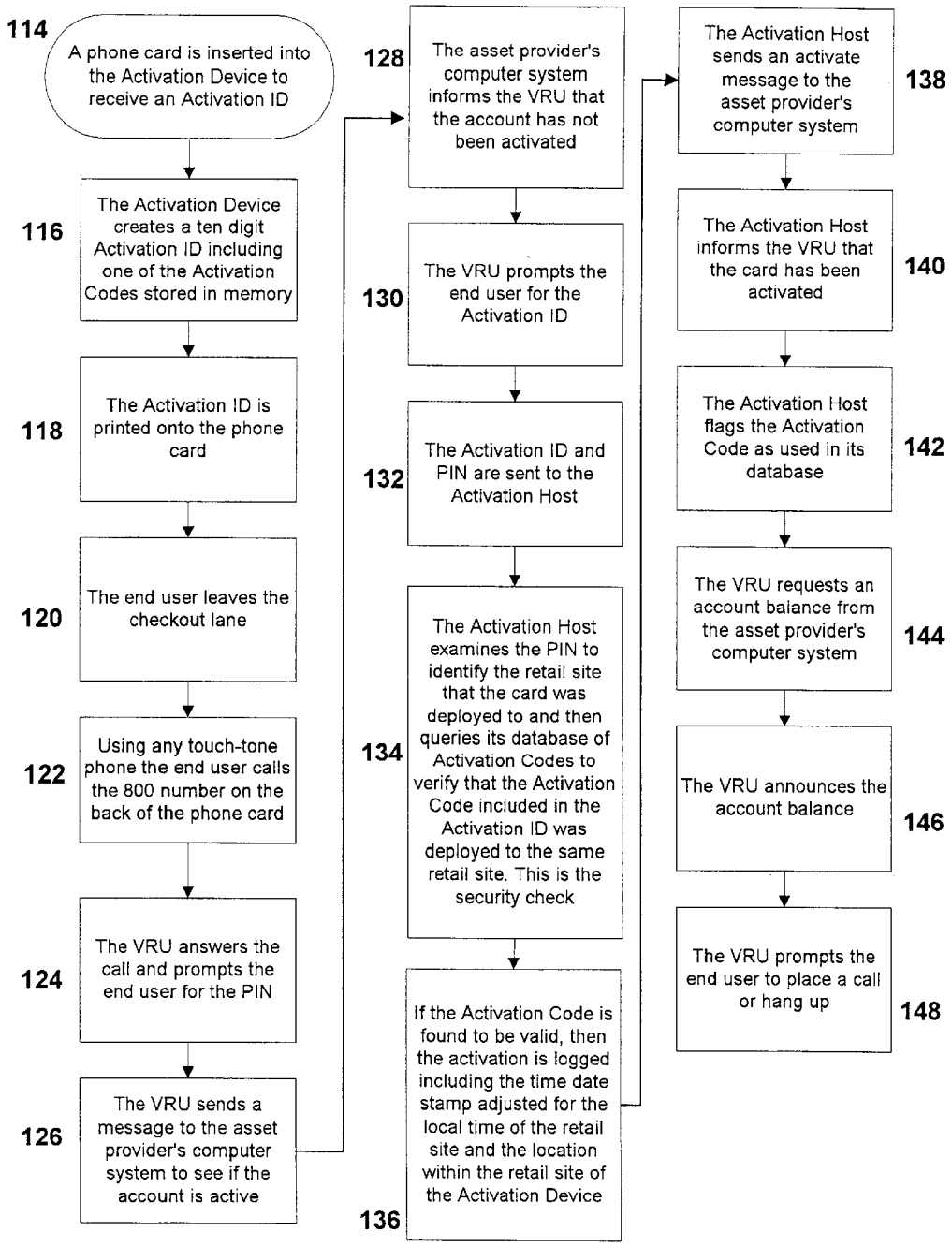
FIG. 6 is a flow diagram illustrating the steps involved in dispensing activation IDs from the activation device to a physical representation of the asset, and also includes the steps involved in activating the asset through the activation host.

FIG. 6 illustrates the basic steps for dispensing of activation IDs, to include the steps involved in validation of dispensed activation IDs. At Step 114, a phone card is inserted into the activation device to receive an activation ID. At Step 116, the activation device creates a ten digit activation ID including one of the activation codes stored in RAM memory, the time/date stamp, and the calculated check sum digit. At Step 1118, the activation ID is printed onto the phone card. At Step 120, the cardholder/owner leaves the checkout lane where the activation device is installed. Using any touch tone phone, the cardholder calls a 1-800 number on the back of the phone card, at Step 122. In lieu of phone communications, an interactive website may be accessed by the end user to communicate with the VRU. At Step 124, the VRU answers the call and prompts the cardholder/owner for the PIN/asset ID. At Step 126, the processing device/VRU sends a message to the asset provider's computer system to query if the account corresponding to the PIN/asset ID is active. At Step 128, the asset provider's computer system informs the VRU that the account has not been activated (assuming that the cardholder is, of course, attempting to activate the asset for the first time). At Step 130, the VRU prompts the cardholder for the activation ID. At Step 132, the activation ID and PIN are sent to the activation host. At Step 134, the activation host examines the PIN to identify the retail site the card was deployed to and then queries the activation database to verify that the activation code included in the activation ID was one which was deployed to the same retail site. This comparison can be deemed the first level security check. At Step 136, if the activation code is found to be valid, then the activation request is logged in the activation database including the time/date stamp (discussed further below) corresponding to the local time of the retail site and the location/checkout lane within the retail site of the activation device. At Step 138, the activation host sends an activate message to the asset provider's computer system. At Step 140, the activation host informs the VRU that the card has been activated. At Step 142, the activation host flags the activation code as used in the activation database. At Step 144, the VRU requests an account balance from the asset provider's computer system. At Step 146, the VRU announces to the cardholder the account balance. At Step 148, the VRU prompts the cardholder to use the asset by placing a call (in the case of a prepaid phone card), or to hang up.

In lieu of the VRU communicating directly with the asset provider's computer system to obtain information regarding account balances, and whether a particular asset has been activated, it is also contemplated within the method of this invention that the activation database could separately maintain such data, which would allow the VRU to contact the activation host for such account balances and activation statuses. Then, on a periodic basis, the activation host could request an update of such information from the asset provider's computer system, and then store the updated information in the activation database. Either alternative would be possible within the method of this invention.

Immediately prior to the dispensing of an activation ID by the activation device, a four digit time stamp is appended to the activation code to create nine of the ten digits of the activation ID. The time and date stamp represents the number of hour time periods that have elapsed since the beginning of the year. The time/date stamp printed on the card represents the time and date when the activation ID was actually dispensed from the activation device. For example, a dispensed timedate stamp 2296 indicates the activation ID was dispensed on April 5th at 3:30 P.M. The clock of the activation device will be synchronized with a clock of the activation host to ensure system consistency. Logic within the activation host will automatically adjust the time/date stamps in accordance with the local time of the activation device for purposes of audit reports which may be produced by the activation host for use by the retailer. According to one alternative of providing a timedate stamp, activation IDs may be issued such that they are only valid for six months, thus the activation host can extrapolate the year in which the activation ID was dispensed. The time/date stamp may also be used to assist the activation host in validating the activation code. That is, when an activation request comes in from the asset owner, the activation host may use the time/date stamp to compare the activation code at issue to tables of valid codes for the identified retail site on the specified time and date. This logic enables cardholders to purchase cards but not activate them until many days after purchase. When an activation code is validated/approved by the activation host, a corresponding entry in the activation code database is removed from the activation code listing authorized for that specific retail location so that a second card cannot be activated with that same code for the same retailer.

Activation codes are stored in a first-in first-out (FIFO) queue in each activation device. Knowing this, the activation host can extrapolate which codes have been distributed to end users by which retailers based on previously validated activation codes. For example, if a particular activation code is known to be the tenth in a series of 20 codes that were distributed to a specific activation device on a given day, then the activation host can assume that all codes that were sent to that device prior to the one in question have been dispensed. The activation host is thus able to maintain efficient data tables of active activation codes based on dates.

A one digit check sum or luhn digit is appended to the first nine digits of the activation ID to create the tenth digit. This luhn digit check sum is calculated from the first nine digits of the activation ID. The use of a check sum on the activation ID provides a quick mechanism to validate that the entire ten digit code was entered correctly by the end user during the activation request process. The check sum can be validated by any device in the system such as the processing device/VRU. Thus, the correct entry of the activation ID itself can be validated, and the owner can be prompted to reenter the ID, if necessary, prior to any requests for activation being sent to the activation host. This prevalidation of the activation ID decreases the potential data traffic flow to the activation host and provides for a more efficient communication network model. The procedure for calculating the luhn digit, along with the verification procedures are as follows:

Activation ID Check Sum Digit Calculation and Verification

A one digit check sum may be appended to the first nine digits of the Activation ID. This digit can be calculated based on the first nine digits of the Activation ID as follows:

Activation Code: "14589"

Time Date Stamp: "2296"—April 5 3:30 P.M.

Step 1:

$$\begin{array}{c} 1\ 4\ 5\ 8\ 9\ 2\ 2\ 9\ 6 \\ \underline{x2\ x2\ x2\ x2\ x2} \\ 2\ 10\ 18\ 4\ 12 \end{array}$$

Step 2:

$$2+4+(1+0)+8+(1+8)+2+(4)+9+(1+2)$$

Step 3:

Sum=42

42+$X$=50

$X$=8

The Checksum is 8 with the complete Activation ID becoming: 1458922968

Validation of an activation ID can be done as follows:

Step 1:

Double the value of alternate digits of the first nine digits of the Activation ID beginning with the first digit from the left (the first right-hand digit is the check sum digit.)

Step 2:
Add the individual digits comprising the products obtained in Step 1 to each of the unaffected digits in the original number.

Step 3:
The total obtained in Step 2 must be a number ending in zero (30, 40, 50, etc.) for the account number to be validated. For example, to validate the Activation ID 4992739872:

Step 1:

$$\begin{array}{c} 4\ 9\ 9\ 2\ 7\ 3\ 9\ 8\ 7\ 2 \\ \underline{x2\ \ x2\ \ x2\ \ x2\ \ x2} \\ 8\ 18\ 14\ 18\ 14 \end{array}$$

Step 2:

$$8+9+(1+8)+2+(1+4)+3+(1+8)+8+(1+4)+2$$

Step 3:
Sum=60: Card number is validated
Note: The Activation ID is valid because the 60/10 yields no remainder.

To calculate the check sum, simply apply steps one and two above to the first nine digits of the Activation ID. The check digit is the number needed to round the sum from step two up to the nearest number divisible by ten.

In addition to the first level security check which compares the activation device location with an asset ID and activation ID, additional security checks can be conducted in the form of velocity checks. The term "velocity" as used herein refers to verifying that a specific type of event is not occurring excessively as compared to the normal operation of the system. There are four types of "velocity checks" suggested within this method. Three are implemented on the activation host, and one is implemented on the activation device.

The first velocity check that may be implemented on the activation host verifies that excessive activation attempts do not occur for a given PEN. If an excessive number of incorrect activation IDs are submitted for any given PIN, the activation host will flag the PIN for potential fraud and send a message to the VRU/processing device. The VRU/processing device will then advise the individual interacting with it that the number of acceptable activation attempts have been exceeded, and a live customer service operator is required to activate the card. The activation attempt limit may be set as desired.

The second and third velocity checks are known as dispense volume velocity checks. The activation host may keep track of the number of activation codes received that were distributed to a single activation device or retail site. By keeping a running average of the number of activations per day for each activation device and retail site, the activation host can signal an alarm and refuse to activate any cards which are outside of typical averages for either the particular activation device and/or the retail site. If an alarm is triggered due to excessive dispensing of activation IDs, the activation host itself can transmit a LOCK device command, also shown at FIG. 10, to the offending activation device, or all of the devices at a particular retail site. A LOCK command may also be sent to any activation device that is reported as being missing or misused. The LOCK command and these two dispense volume velocity checks are described in additional detail below.

The fourth velocity check may be implemented on the activation device. Each device may be limited to the number of activation IDs that it can dispense in a given time frame. A typical setting for this limit might be six cards per 24-hour period. This velocity limit may be adjusted through the use of the LIMIT device command, as shown in FIG. 10. If the preset limit is exceeded, the device is disabled and the red trouble light will come on. Additional detail on this LIMIT command and velocity check is discussed below.

As a review of the activation procedure, once the end user has received delivery of both the activation ID and the prepaid card with the asset ID preprinted thereon, the card can be activated by the end user or someone acting on behalf of the end user. In the case of prepaid phone cards, the end user may interact with the same VRU/processing device that the provider uses to accept calls for long distance service. The end user places a call via any touch tone phone to the 1-800 number listed on the back of the card, the VRU answers the call and prompts the end user to enter the PIN for the account. The VRU communicates with either the activation host or the asset provider's computer system to ascertain the status of the account. The account can have a variety of statuses including active, inactive, terminated, depleted, or invalid. When the account is inactive and the asset provider's host computer/activation host has responded to the VRU with a message indicating that the account is valid but inactive, the VRU then prompts the end user to enter the activation ID for the account and verifies that the ID was entered correctly by validating the check sum digit on the ID. If the asset provider's host computer/activation host would have indicated any other status for the account, then the user would not be prompted to enter the activation ID. Other menu options would be provided by the VRU to handle account statuses other than inactive. Assuming the asset is inactive, the VRU then sends an activation request to the activation host inclusive of both the PIN and the activation ID.

The activation host examines the PIN and queries its activation database for the retailer ID associated with that PIN. As discussed above, the activation database includes data on each retailer, and each retailer can be assigned a unique retailer ID. Using the retailer ID as a key, the activation host then compares the activation code within the activation ID to the table or listing of activation codes that are listed as valid for the specific retail site during the time that is indicated by the timedate stamp included in the activation ID.

If the activation code is found to be valid, a message is forwarded to the asset provider's computer system to activate the account and trigger any billing functions that coincide with the activation of an account. When the activation host receives a positive confirmation that the account has been activated from the asset provider's computer system, the activation host logs the activation data in the activation database for itemization on reports and removes the activation code from the list of approved codes for the corresponding activation device and/or retail site which dispensed the activation code. Once all the data logging is complete, the activation host sends a message to the VRU indicating that the activation host has approved the activation and a request to activate the account was sent to the asset provider's computer system. As an additional verification step, and to confirm that an error did not occur between the activation host and the asset provider's computer, the VRU may then resend the PIN to the asset provider's computer system as part of an account status query. The account is now active and the asset provider's computer system/activation host also responds with the balance of the account. Finally, the VRU indicates to the end user that the account has been activated and communicates the balance of the account before prompting the end user to place a long distance call, in the case of a long distance prepaid card, or hang up.

When the activation host receives the PIN and activation ID, it also checks to make sure that there have not been too many invalid requests for activations related to this PIN. If the limit has already been exceeded, or if this request exceeds the limit, then an activation request counter for the PIN is incremented and a decline message is sent to the VRU. Additionally, notification of potential fraud is sent to the network administrator. Assuming the PIN has not been flagged due to excessive activation attempts, the timedate stamp is retrieved so that the activation host can approve the activation code. If the code is invalid for the identified retail site, then a decline message is sent back to the VRU, a notification of potential fraud is sent to the network administrator, and the activation attempt counter is incremented. If the activation code is found to be valid, the activation host then moves into a set of velocity checking logic for dispense volumes.

The first dispense volume velocity check establishes if the number of activations from a given retail site exceeds, by a set amount, the average number of activations for that site. If the limit is reached, the activation host increments an activation request counter for that retail site, sends a decline message to the VRU, notifies the network administrator and immediately sends a LOCK command to the all the devices registered to that retail location. This logic prevents fraud perpetrators from inappropriately depleting the deployed inventory of activation codes at any given retail site and attempting to activate them within a short time period. By limiting the number of activations allowed in a given time frame, it is expected that retailers will be able to report fraud or theft before too many accounts can be activated inappropriately.

The second dispense volume velocity check mirrors the first but only for the specific device that dispensed the activation ID. If the velocity limit is exceeded for the given device, the activation attempt counter for the device is incremented, a decline message is sent to the VRU, the network administrator is notified and a LOCK command is sent to that specific device. If no velocity limitation has been breached then the account is activated through the same process that was defined previously.

The LOCK device command mentioned above is one of several potential commands that can be issued from the activation host to the activation device. Device commands are flags requesting that a specific action be taken by the activation device. Multiple device commands may be distributed to a single activation device in a single datagram. One-way paging does not provide a mechanism for confirmation of receipt responses to be generated. It is therefore assumed in the one-way paging model that all messages sent to activation devices will be received. However, to ensure delivery of critical commands such as the "LOCK" command, some device commands may be sent multiple times during a distribution cycle.

Two-way pager messaging affords a mechanism for the activation devices to respond directly to the activation host. The benefit of this mechanism is that the activation devices can generate confirmation messages and respond with data to the activation host. Additionally, two-way paging enables the activation devices to produce unsolicited messages to the activation host. FIG. 10 lists seven potential device commands and notes which are not available under the one-way paging model.

Figure 9:
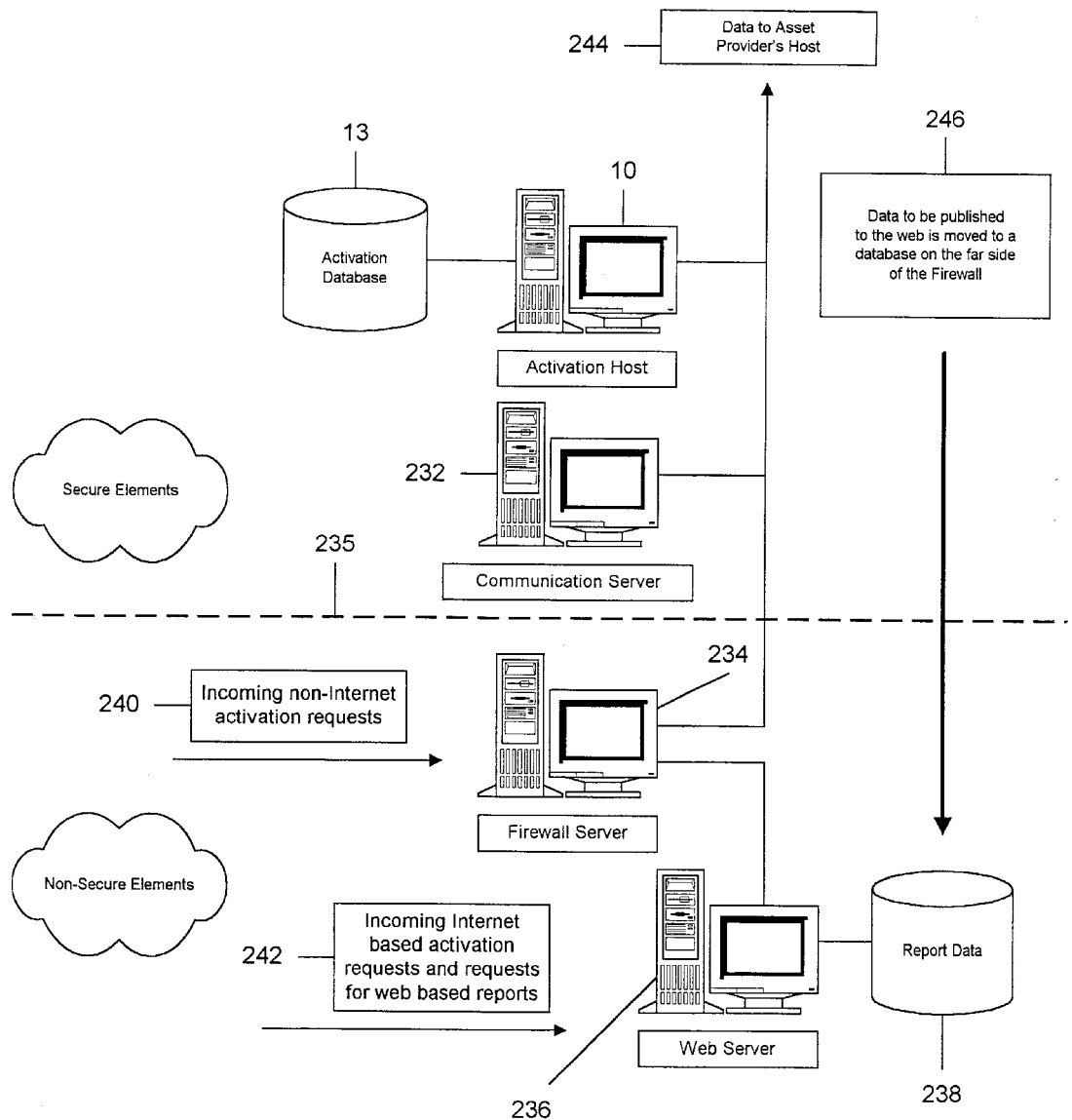
FIG. 9 is a schematic diagram illustrating the basic architecture and components of an activation network.

The data collected by the activation host with reference to activation attempts and successes as well as distributed activation codes and device commands is used to generate audit and status reports for the various parties including the retailer and the provider. These reports may be paper based our created through electronic media such as web publishing (FIG. 9). The audit reports provided to the retailer will be used to reconcile the provider's invoices. Additionally, the retailer can track the sales of cards with its own POS system as each set of cards with like values will be assigned a different UPC or other bar code indicator, for example, all fifty dollar cards would have the same UPC, or all 100 minute cards would have the same UPC or SKU.

Figure 7:
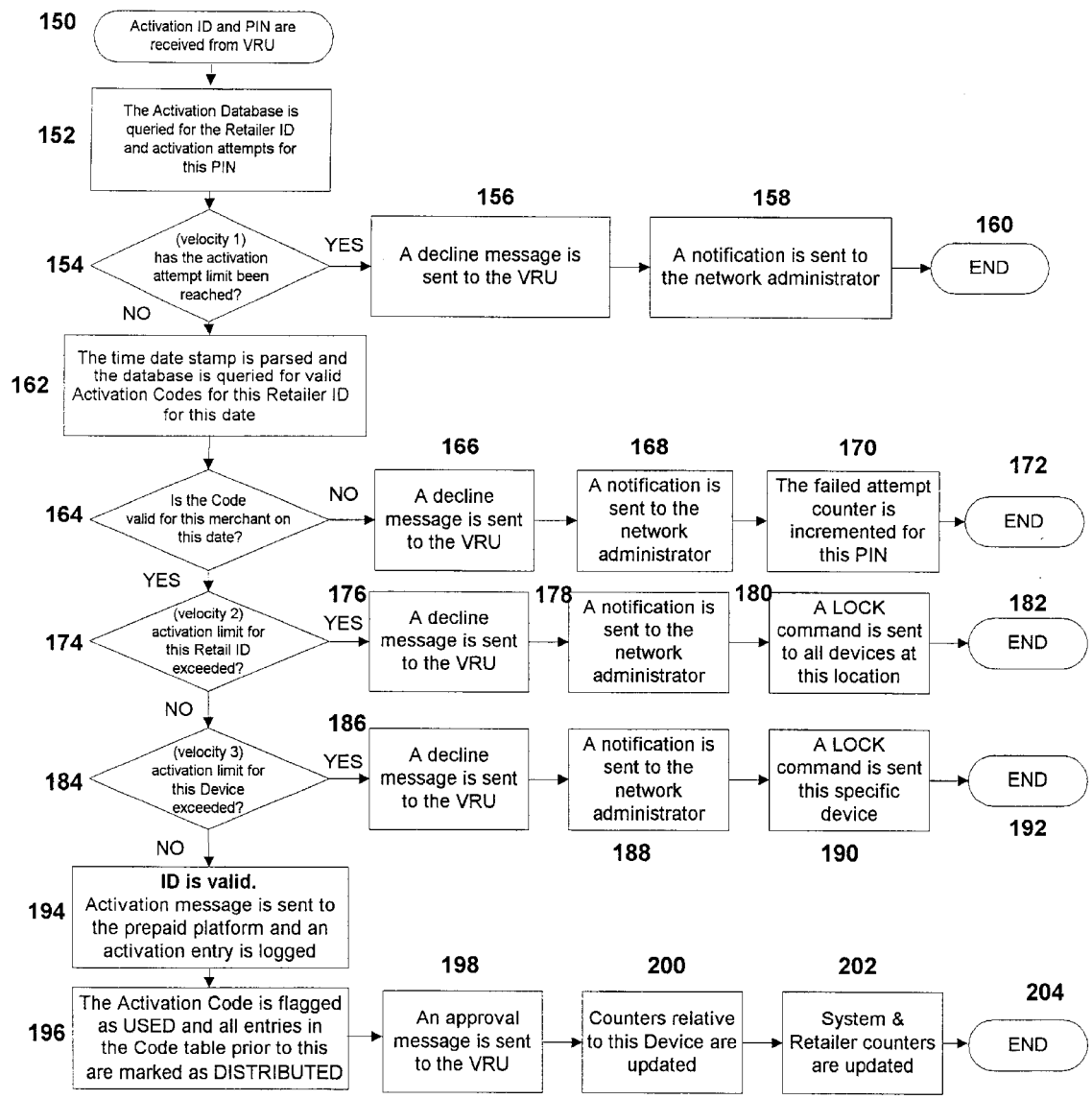
FIG. 7 is a flow diagram illustrating the basic logic used by the activation host to validate an activation request for an account corresponding to a particular asset.

FIG. 7 summarizes the activation host validation logic. As shown at Step 150, the activation ID and PIN are received from the VRU. At Step 152, the activation database is queried for the retailer ID and activation attempts for the PIN. At Step 154, if the activation attempt limits have been reached (velocity check one), then at Step 156, a decline message is sent to the VRU, a notification is sent to the network administrator at Step 158, and the activation attempt is terminated at Step 160. If the activation attempt has not been reached, then at Step 162, the timedate stamp is parsed and the activation database is queried for valid activation codes for the particular retailer ID and for the date of the transaction. At Step 164, if the activation code is not valid for the particular retailer on the particular date, then at Step 166, a decline message is sent to the VRU, notification is sent to the administrator at Step 168, the failed attempt counter is incremented for the PIN, and the activation attempt is terminated at Step 172. If the activation code is valid, then the number of activations for this retail site is examined at Step 174. If this second velocity check is exceeded for the retail ID, then a decline message is sent to the VRU at Step 176, notification is sent to the administrator at Step 178, a lock command is sent to all devices at the retail location at Step 180, and the activation request is terminated at Step 182. If the second velocity check is not exceeded, then a third velocity check may be conducted at Step 184 to examine the number of activations for the specific activation device. If this velocity check is exceeded, then again, a decline message is sent to the VRU at Step 186, notification is sent to the network administrator at Step 188, a lock command is sent to the specific device at Step 190, and the activation attempt is then terminated at Step 192. If none of the velocity checks are exceeded, then the ID can be considered valid at Step 194. An activation message is sent to the asset provider's computer and an activation entry is logged in the activation database. At Step 196, the activation code is flagged as used and all entries in the activation code table prior to this entry are marked as "distributed." At Step 198, an approval message is sent to the VRU, counters (in the activation database) relative to the particular activation device are updated at Step 200. At Step 202, other system and retailer counters are updated, thus ending the activation process at Step 204. Although three velocity checks have been described, it shall be understood that the method does not require all three, and combinations of the three may be used together, or a single velocity check may be appropriate for some retailers.

Figure 8:
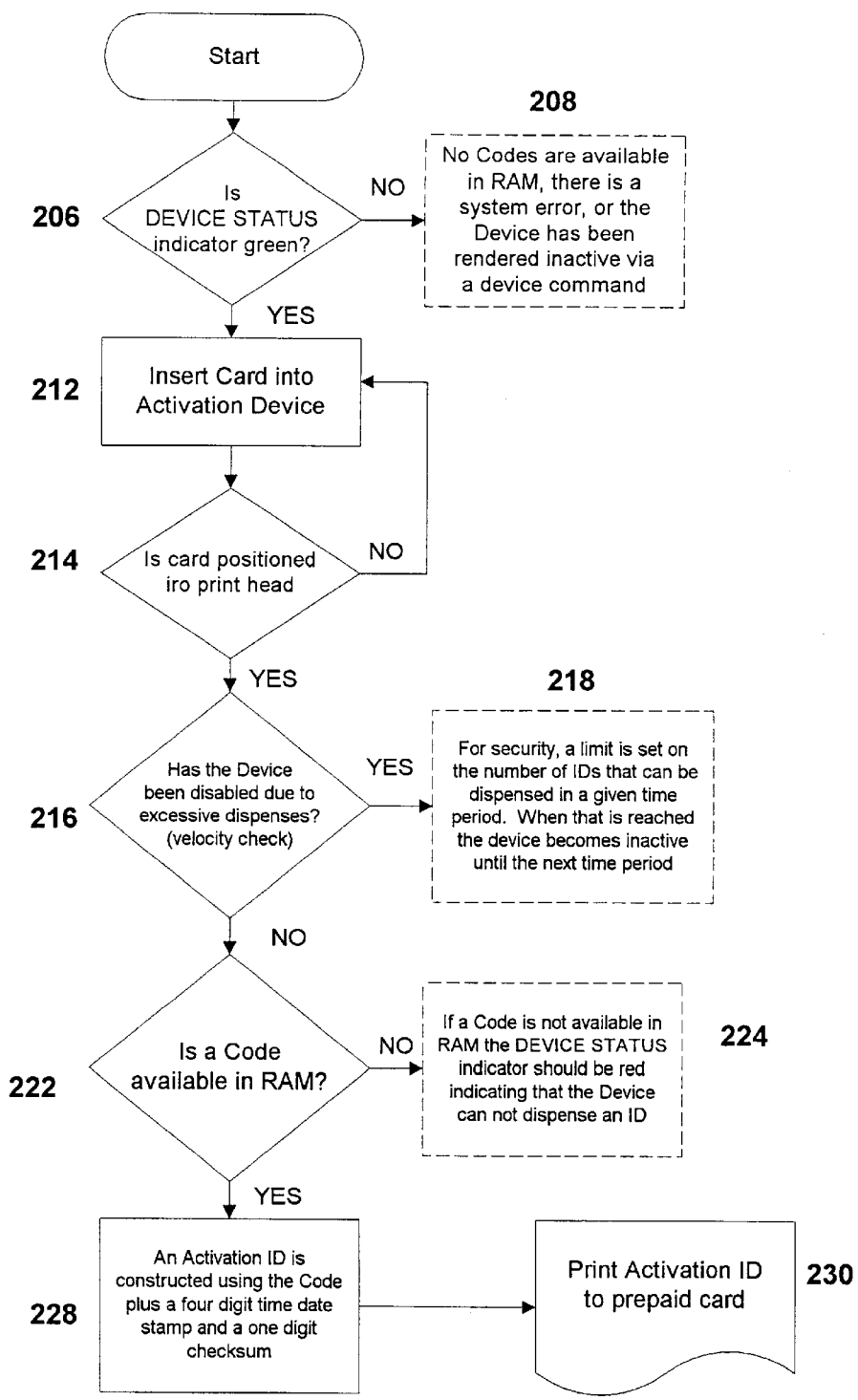
FIG. 8 is a flow diagram illustrating the basic logic used in dispensing activation IDs, and troubleshooting an activation device for basic faults.

FIG. 8 illustrates the basic logic in dispensing activation IDs. At Step 206, the operator checks to see if the device status indicator (indicator light 40) is green. If not, then at Step 208, this may mean that no activation codes are available in RAM, there is some other system error, or the device has been rendered inactive via a kill or lock command. If the device status indicator (light 40) is green, then a card may be inserted into the activation device at Step 212. The card must be positioned in alignment with the print head, as shown at Step 214. If the card is not in alignment, then the card must be reinserted. Assuming the card is positioned correctly, the next step is to wait to determine if the device has been disabled due to excessive dispenses (velocity check) at Step 216. If the limit of allowed dispenses has been reached, then at Step 218, the device becomes inactive until the next time period in which activation IDs can be dispensed. If this limit has not been exceeded, then at Step 222, the next step is to determine whether there are available activation codes in RAM. If no codes are available in RAM, the red status indicator (light 42) should be lit indicating that the device cannot dispense an activation ID, shown at Step 224. Assuming activation codes are available in RAM, then an activation ID is constructed using the activation code, the four digit timedate stamp, and the one digit check sum, at Step 228. Finally, the activation ID may be printed on the prepaid card, at Step 230.

FIG. 9 is a schematic diagram illustrating the basic architecture and entities of the activation network. The activation network is preferably fault tolerant with dual data paths and redundant systems to ensure traffic flow. The various systems of the activation network are divided into secure and non-secure elements. These elements are delineated or separated by a firewall, illustrated as line 235, that restricts the flow of data from non-secure elements to secure elements. Below line 235 are the non-secure elements, while the elements above line 235 are secure elements.

The functions of the non-secure, or public side of the firewall are to accept incoming activation and report requests and to publish report data. Incoming activation request messages come into the system across public and private network connections. Public connections include, of course, Internet-based requests 242. Non-Internet and private activation requests 240 might include LAN, WAN, or other networks linked to the activation network. Report requests (for example, from a retailer) are transmitted through 240 or 242. Both types of requests hit the web server 236. If the incoming message is an activation request, the web server 236 routes the request to the communication server 232 on the private side of the firewall 235 through the firewall server 234. The firewall server 234 validates that any data requesting to cross the firewall 235 is being sent from a pre-approved IP address. The firewall server 234 also accepts incoming requests from the private, or non-Internet, network connections 240 by validating that such incoming activation requests 240 are coming from pre-approved systems. The VRUs would most likely connect to the activation network via a private network connection.

If an incoming message via the Internet 242 is a report request, the web server 236 generates one of many dynamic reports based on data that is stored in the report data database 238. The purpose of this publicly located database 238 is to prevent report requests and associated database queries from overtaxing the activation database 13. The web server 236 will only query the local report data database 238 to generate web based reports. To keep the report data database 238 up to date, the data needed to generate reports is replicated from the activation database 13 to the report data database 238 using real-time triggers which forward data through the communication server 232 and firewall server 234.

The three elements on the private side of the firewall include the communication server 232, the activation host 10 and the activation database 13. The communication server 232 manages the traffic. It provides load balancing services, message addressing and protocol translation. Should any one specific system of the network begin to reach its maximum throughput threshold, or if a system fails, the communication server 232 will redirect network messages to secondary systems (not shown). The communication server 232 is the element that enables the activation network to communicate with the various systems of the asset provider's computer and VRU systems. Additionally, the communication server 232 keeps track of bandwidth usage on a daily basis and provides usage reports and problem alarms for the network administrator.

The activation host 10 provides the validation/approval, security tracking and activation code distribution logic. All messages to and from the activation host 10, including activation messages intended for the provider's host 244, first pass through the communication server 232 which routes the messages to appropriates system services or translates the data and protocols as necessary. The activation host 10 interacts directly with the activation database 13. The activation database 13 stores detail about retail and distribution sites as well as the activation code and PIN tables for each site. Additional tables that enable the activation host 10 to provide velocity checks and fraud detection are also stored here as well as the activation success and failure logs. Data to be published to the worldwide web 246 is moved to the report data database 238 on the public or non-secure site of the firewall.

FIG. 10 is a sample datagram that may be transmitted to an activation device. It is assumed that the particular paging network's protocol will deliver the datagram in its entirety to the addressed activation device. The entire datagram is encrypted prior to distribution and decrypted by the activation device.

FIG. 11 is a table of basic device commands which may be sent from the activation host to the activation device. The table notes whether commands are available for the one-way or two-way paging networks.

FIG. 12 summarizes a description of the ten digits or fields within an activation ID dispensed from an activation device. Although the preferred embodiment uses a ten digit activation ID, it shall be understood that other specific activation IDs may be used having differing fields and differing data elements.

FIG. 13 provides an example of calculating a particular timedate stamp.

The method of this invention described above also provides for refresh, refund, and void capabilities as follows:

Refresh of an existing account can be accomplished one of two ways. First, if the end user has an established credit card account then the card can be refreshed using the asset provider's refresh facilities (asset provider's computer system) which may be a menu option with the automated VRU. The second way would be interaction with a customer service representative. Both methods can be accomplished using a phone or via the Internet.

A refund occurs when an end user requires the balance of their account to be refunded. Because refund transactions carry a large opportunity for fraud it is suggested that refunds not be supported except on a special case by case basis and through interaction with a live customer service operator through contact with the VRU.

Voiding a transaction is specifically different from a refund. A void occurs when a sale is canceled. For example, if an end user attempts to purchase some groceries and a prepaid phone card only to find that they forgot their wallet, then all the items of that transaction, including the phone card must be voided. The void mechanism of this method is procedural and can occur in two different ways. First, if the void of the sale occurs prior to the dispensing of an activation ID then no further action is required by the sales clerk. If however, an activation ID was dispensed prior to the void of the sale then an accounting for that activation ID must occur or the retailer could potentially be liable for the wholesale price of the card if an unauthorized user were to use that activation ID to activate another card. However, voids of this type would be rare as dispensing of activation IDs should not occur until the sale has been completed.

It is suggested that the retailer implement a procedure wherein the sales clerk marks over a voided activation ID with a black marker and then place the card in the cash drawer. When the cash drawer is reconciled, the number of cards with blackened activation IDs should total phone card voids reported for that register.

If necessary, a more robust void procedure can be implemented wherein the manager at the retail locations immediately interacts with a VRU program to indicate to the provider that an activation ID was dispensed unintentionally. This process will have the effect of terminating the usability of the given activation ID.

The advantages of the above described method and apparatus are many. In comparison to the method and apparatus taught in U.S. Pat. No. 5,903,633, the above method is an improvement in that it does not need for the cards to be encoded with magnetic strips or stripes, it does not rely on strip readers at retail locations, and does not require that the retail location connect to the provider's central computer at the time of sale to activate an account. Thus, the off-line or push methodology of this invention allows activation codes to be distributed at any time, including off-peak network hours for cost savings. The '633's method has the potential to be unavailable if the equipment in the retail location cannot connect to the remote computer system at the time of sale. However, the method described above is available to dispense activation IDs without having to communicate with the asset provider at the time of sale. The magnetic strip readers required in the '633's method must be bi-directional, real time communication point of sale equipment, further requiring a remote computer system to be installed at the retail location. This equipment is extremely expensive, and often prohibitively so within the business model of prepaid telecommunications which may only generate nominal profits. With the '633 reference, activation of the asset occurs upon purchase of the asset. In the method described above, the communication of the PIN and activation ID back to the activation host occurs at a later time, and not during the actual sales transaction. The method described above has the benefits including removing the need for real time data communications, as required in the '633 reference, and also increases "retailer float" and reduced cost of equipment at the retail location. Retailer float refers to the amount of time that monies are held by the retailer from a purchase before receiving a billable from the asset provider. Under the above method, retailer float is increased because the retailer does not incur a billable until the cardholder activates the card via interaction with the VRU. Activation may not occur for some period of time after the sale. This increased retailer float makes the method of this invention more desirable by many retailers. If the cardholder never activates the card, then all revenue from the sale of the card remains with the retailer. This is known as "retailer breakage." Thus, the above method also increases retailer breakage in that assets paid for but never activated enure totally to the benefit of the retailer, without receiving any corresponding billable from the asset provider.

Another advantage of the above method is that the sale or product can occur anywhere where an activation device is located. The activation device may be driven from battery power, and may be connected via a wireless network. Therefore, the apparatus of this invention is much more flexible in terms of where it can be installed and operated in comparison with the apparatus of the '633 reference.

Also, the above method of this invention supports any number of differing types of physical representations of the assets to include various shaped cards or other media which simply need to have the capability to receive printed matter or labels. As long as the activation ID can be placed on the media, the media can be used as the representation of the asset. With the '633 reference, use of magnetic striped cards limits the number of materials which can be used. Also, there are limited types of equipment which may accept magnetic striped cards, magnetic striped cards themselves are more expensive than paper or plastic cards, and magnetic striped cards are subject to damage or destruction by minimal scratching or wear of the magnetic stripe.

It is also noted that the security features described above have advantages over the '633 reference. Specifically, the use of multiple activation codes with limited life spans which are validated by date of issuance help to prevent fraud. The '633 reference is silent as to providing any regularly changing activation codes and preferably requires that the POS device be continually connected to a registered phone line so that automatic number identification (ANI) can be used to identify the location of the POS device. Additionally, the velocity checking logic at both the activation device and at the activation host improves security. The '633 reference provides no such velocity checking. Furthermore, the above method goes the additional step of providing a way to actually disable or lock-out one or more activation devices at a retail location suspected of potential fraud by sending a LOCK command from the activation host to the activation device. LOCK commands can be repeatedly sent to offending devices, and can effectively disable devices even though they may have been removed from their designated locations.

Another advantage of the above described invention is that since this method does not generally approve or disapprove of the sale transaction, if the sale is voided or terminated, there is no action required since an activation ID has not been dispensed, thus no billing event was triggered. With the '633 reference, the activation of the asset is so closely linked to the actual sale of the asset, it requires that the retailer contact the provider in the case where a sales transaction must be voided. In other words, the activation of an asset in the '633 reference occurs prior to the sale of the card causing a billing triggered that must be reversed if the sale is not consummated.

Finally, the '633 reference does not address the need for audit reports to be generated by either the local equipment at the retail site or by the host computer. These audit reports are a benefit to the retailer in tracking the sales and activation of product. In the above method, a variety of mechanisms are used to provide audit reports including web publishing. This method described above also contemplates the strategy of assigning like valued card with the same UPC, SKU, or bar code ID so that the local point of sale equipment can track sales.

The method of this invention also has the capability to support paper based activation code distribution. Thus, this can be considered the second preferred embodiment of the method of this invention. The basic concept for this method is to distribute activation codes to retail locations via a sheet of labels, as shown at FIG. 14. This method still provides the retailer all of the activation host based security and validation features while enabling the asset provider a quick and cost effective means to distribute activation codes.

Distribution of paper based activation codes requires additional features from that of the one-way paging based activation method. Most notably, the activation codes will be printed by the activation host which will append a luhn check digit to the activation code thus creating a ten digit activation ID inclusive of a nine digit activation code and the one character check digit. These ten digit activation IDs enable the activation host to generate unique IDs, up to a total of 999,999,999, so that no two IDs will ever be active in the field at one time. Additionally, the ten digit paradigm removes the need for the activation interfaces, such as the VRU, to distinguish between wireless device generated IDs and paper based IDs since both will be ten digits in length inclusive of a single luhn digit terminator.

Wireless activation devices work in such a way that activation IDs are only dispensed as needed and have imbedded logic that limits the number of IDs that can be dispensed in a day. Additionally, if an activation device is suspected of fraud, the device can be remotely disabled so that no further IDs can be dispensed from the offending device. The paper based distribution method does not support these features so additional security features are provided to limit the provider's liability. First, according to this second preferred method, only a limited number of activation IDs are distributed to retail site. The number of activation IDs distributed to a given retail site will depend on the risk management rating of that site and the anticipated sales volume of the site. Retail sites that pose a low risk and that generate a high volume of sales will be afforded more activation IDs per distribution mailing than other sites.

The activation host tracks the distribution volumes of each site and will automatically distribute additional activation IDs to a site so that the sites always have an inventory of activation IDs, but not so many as to pose an excessive risk to the provider. Activation IDs are mailed to retail sites on sheets of adhesive backed labels. Each sheet is assigned a tracking number that is printed on the sheet. To ensure that sheets to not fall into the wrong hands during the mailing process, all activation IDs on a sheet are disabled or invalid until the receiving retail site communicates to the activation host that the sheet was received. This will generally be accomplished by an individual at the retail site calling a special 800 number and interacting with a VRU to provide the tracking number of the each sheet along with some predetermined pass code assigned to the particular retailer.

The process of enabling a sheet of activation IDs is much like that of activating an asset. The VRU will send a message to the activation host inclusive of both the sheet tracking number and the retail site's pass code. The activation host will verify that the sheet was shipped to the site that corresponds with the pass code and then authorize enablement of the sheet. The activation host will then communicate with the asset provider's computer system to inform that the sheet of assets has been authorized for enablement, and the sheet is thus enabled. When the sheet is enabled, the retail site can use the activation IDs by affixing them to prepaid products that are sold at the location. Thus, the definition of an "enabled sheet" of activation IDs is activation IDs which can be placed on the representation of the asset, i.e., a card, and then activated by the end user when the asset has been paid for. In other words, the sheet of activation IDs represents, within the first method described above, those activation IDs which have been dispensed from an activation device.

When the end user has purchased the asset, the asset is activated in the same manner as set forth in the first method which entails the end user contacting a processing device/ VRU, providing the activation ID and PIN, and then waiting for confirmation from the VRU that the asset is valid and activated. It is expected that when a new sheet of activation IDs is enabled for a given site, all IDs on pre-existing sheets will be disabled. The reason for this is to limit the number of sheets with enabled activation IDs at any one site which will reduce the chance of theft as well as remove the need for management to keep track of more than one sheet. However, retail sites that support multiple registers may be allowed to have multiple enabled sheets.

The sheets of activation IDs are designed to be a self auditing mechanism for the retail site. Each sheet includes, as shown at FIG. 14, a column of activation ID labels with space to log the time, date, location and clerk that distributed each ID. The management of the retail site can then use spent sheets to reconcile invoices from the provider. A retail site can request additional codes should it experience higher than normal sales volumes.

FIG. 14 not only illustrates a sample sheet of activation IDs, but also the instructions which may accompany the sheet. The activation ID label appearing in the most left column is the label which is removed from the sheet and placed upon the prepaid card. This activation ID label has the activation ID printed thereon, which also matches the activation ID printed on the same line. Thus, the clerk, date, time, and card value are recorded corresponding to the specific activation ID which has been provided to the end user.

This invention has been described in detail with reference to particular embodiments thereof, but it will be understood that various other modifications can be effected within the spirit and scope of this invention.

What is claimed is:

1. An apparatus for activation of an asset comprising:
an activation host residing at a first location for controlling and exchanging information regarding each asset of a plurality of assets purchased by an asset owner from a distributor, said activation host comprising a centralized computer for controlling and exchanging said information regarding each said asset;
an activation database for storing said information regarding each said asset, said activation database having a plurality of data records corresponding to said plurality of assets, said plurality of records including a unique activation code corresponding to each asset, and a unique account assigned each asset;
an activation device residing at a second location remote from said activation host, for exchanging information regarding said plurality of assets with said activation host, said activation device having means for printing data including said unique activation code, said activation device further including means for communicating with said activation host and processor means for processing data exchanged with said activation host;
a processing device residing at a third location remote from said activation host and said activation device for processing activation requests initiated from said asset owner, said processing device electronically communicating said activation requests to said activation host;
a plurality of physical mediums representing corresponding assets, each medium of said plurality of mediums having a unique asset ID thereon corresponding to said unique account in said activation database; and wherein
a plurality of activation codes are transmitted to said activation device by said activation host and are stored in said activation device on a periodic basis, upon purchase of an asset by said asset owner from said distributor, at least one medium of said plurality of mediums being engaged with said activation device wherein said activation device transfers a corresponding activation code to said at least one medium, said activation code not being magnetically encoded on the medium and being visibly observable on the medium and wherein said processing device, upon prompting by said as set owner, communicates said asset ID and said activation code for comparison by said activation host to determine whether to activate said asset.

2. An apparatus, as claimed in claim 1, wherein:

said activation device further records the date and time of a purchase transaction for purchase of an asset by said asset owner, and said date and time being recorded on said at least one medium, said activation code and said date and time comprising a unique activation ID corresponding to each asset.

3. An apparatus as claimed in claim 1, wherein:

said processing device includes a voice response unit that prompts the asset owner for the asset ID and activation code of the corresponding asset, said voice response unit then transmitting said asset ID and activation code to said activation host to determine whether to approve said asset for activation.

4. An apparatus, as claimed in claim 1, wherein:

said processing device comprises a personal computer including means for accessing and using a worldwide web browser, said asset owner interacting with said web browser which prompts the asset owner to provide the asset ID and activation code, and said asset ID and activation code being transmitted to said activation host via the worldwide web.

5. An apparatus, as claimed in claim 1, wherein:

at least one of said plurality of mediums is in the form of a card.

6. An apparatus, as claimed in claim 1, wherein:

said at least one of said plurality of mediums is in the form of material which can receive printing from said means for printing data.

7. An apparatus, as claimed in claim 1, wherein:

said asset corresponds to a preset number of long distance calling minutes.

8. An apparatus, as claimed in claim 1, wherein:

said asset corresponds to a gift certificate of a preset value.

9. An apparatus, as claimed in claim 1, wherein;

said medium corresponds to a transit ticket of a preset value.

10. An apparatus, as claimed in claim 1, wherein:

said asset corresponds to a redeemable certificate for a preset value of gasoline.

11. An apparatus, as claimed in claim 1, wherein:

said asset corresponds to prepaid values of cellular phone service.

12. An apparatus, as claimed in claim 1, wherein:

said asset corresponds to prepaid paging services.

13. An apparatus, as claimed in claim 1, wherein:

said asset corresponds to prepaid worldwide web access.

14. An apparatus, as claimed in claim 1, wherein:

said asset corresponds to cable or satellite TV access.

15. An apparatus, as claimed in claim 1, further comprising:

an asset host communicating with said activation host, said asset host including a centralized computer for receiving and sending information regarding said plurality of assets, said activation host generating data to said asset host reflective of activation approvals of said plurality of assets, and said asset host recording said approvals which correspond to assets having said unique accounts.

16. An apparatus, as claimed in claim 1, wherein:

said plurality of data records of said activation database further include activation device records enabling said activation host to identify each activation device communicating with said activation host and further enabling said activation host to match each activation device with corresponding activation codes and asset IDs which are handled by said activation device.

17. An apparatus, as claimed in claim 1, wherein:

said plurality of data records of said activation database further include identifying records in the form of distributor ID a for each distributor having activation devices installed at corresponding locations of said distributors, said distributor IDs enabling said activation host to further identify and match each activation device with corresponding distributors, and further enabling said activation host to identify each activation code and asset ID with each distributor ID and each activation device.

18. An apparatus, as claimed in claim 1, wherein:

activation codes transmitted by said activation host are encrypted, and said activation codes are decrypted by said activation device upon receipt from said activation host.

19. A method of activating an asset purchased by an asset owner from a distributor, said method comprising the steps of:

providing an activation host residing at a first location including a centralized computer and an activation database, creating and storing a plurality of data records in said activation database, said data records including a plurality of account records, each account record corresponding to a unique asset, said data records further including a plurality of activation codes;

providing a physical medium as a tangible representation of the asset;

placing an asset ID on the medium, each medium having a unique asset ID;

distributing the medium to the distributor;

providing at least one activation device for each distributor, said at least one activation device residing of a second location remote from said activation host, said activation device communicating with said activation host;

electronically transferring a plurality of activation codes by said activation host to said activation device;

temporarily storing said plurality of activation codes in said activation device;

executing a purchase transaction wherein the asset owner purchases an asset from the distributor;

engaging the medium representing the asset of the purchase transaction with the activation device;

dispensing a unique activation code on the medium by said activation device, said activation code not being magnetically encoded on the medium and being visibly observable on the medium;

requesting activation of the asset by the asset owner communicating with the activation host;

comparing information from said medium having the asset ID and the activation code thereon to determine whether the asset can be activated; and transmitting a message indicating approval or disapproval of activation of the asset.

20. A method, as claimed in claim 19, further including the step of:

dispensing a time/date stamp by the activation device and placing the time/date stamp on the medium along with the activation code; and comparing the asset ID and activation code along with said time/date stamp by said activation host to determine approval or disapproval of the activation request.

21. A method, as claimed in claim 19, further comprising the steps of:

providing a plurality of retailer ID records in said plurality of data records corresponding to unique distributors; and further comparing the distributor IDs with said asset ID and said activation code to determine approval or disapproval of the activation request.

22. A method, as claimed in claim 19, further comprising the steps of:

providing a processing device for processing activation requests generated by the asset owner; and communicating said activation request through said processing device to said activation host.

23. A method, as claimed in claim 19, further comprising the steps of:

assigning predetermined asset IDs to selected distributors.

24. A method, as claimed in claim 19, further comprising the step of:

assigning a predetermined asset value to each account record.

25. A method, as claimed in claim 19, further comprising the steps of:

assigning a predetermined number of activation codes to predetermined distributors.

26. A method, as claimed in claim 19, further comprising the steps of:

assigning predetermined activation codes to designated activation devices.

27. A method, as claimed in claim 19, further comprising the steps of:

encrypting activation codes transmitted by the activation host to said activation device; and decrypting the activation codes by the activation device prior to dispensing the activation codes.

28. A method, as claimed in claim 19, further comprising the steps of:

recording the time and date when an activation code is dispensed, and placing the time and date on the medium along with the activation code during said dispensing step; and further comparing information from said asset ID, said activation code, and said time/date stamp to determine approval or disapproval of the activation request.

29. A method, as claimed in claim 19, further comprising the steps of:

providing an asset host including an asset provider's computer system;

transmitting data from said activation host reflective of approved activations to said asset providers computer system; and creating a billable record from said asset provider's computer system reflective of activated assets corresponding to the respective plurality of account records, and sending the billable record to an invoicing computer of the distributor.

30. A method of activating an asset purchased by an asset owner from a distributor, said method comprising the steps of:

providing an activation host including a centralized computer and an activation database;

creating and storing a plurality of data records in said activation database, said data records including a plurality of account records, each account record corresponding to a unique asset, said data records further including a plurality of activation codes;

providing a medium as a tangible representation of the asset;

placing an asset ID on the medium, each medium having a unique asset ID;

distributing the medium to the distributor;

providing at least one activation device for each distributor, said activation device communicating with said activation host;

electronically transferring a plurality of activation codes by said activation host to said activation device;

temporarily storing said plurality of activation codes in said activation device;

executing a purchase transaction wherein the asset owner purchases an asset from the distributor;

engaging the medium representing the asset of the purchase transaction with the activation device;

dispensing a unique activation code on the medium;

requesting activation of the asset by the asset owner communicating with the activation host;

comparing information from said medium having the asset ID and the activation code thereon to determine whether the asset can be activated;

transmitting a message indicating approval or disapproval of activation of the asset;

determining a threshold value for an allowed number of activation attempts per asset;

recording the number of activation attempts for each asset; and transmitting a message from said activation host to said asset owner indicating approval or disapproval of the activation request based upon the number of activation attempts.

31. A method of activating an asset purchased by an asset owner from a distributor, said method comprising the steps of:

providing an activation host including a centralized computer and an activation database;

creating and storing a plurality of data records in said activation database, said data records including a plurality of account records, each account record corresponding to a unique asset, said data records further including a plurality of activation codes;

providing a medium as a tangible representation of the asset;

placing an asset ID on the medium, each medium having a unique asset ID;

distributing the medium to the distributor;

providing at least one activation device for each distributor, said activation device communicating with said activation host;

electronically transferring a plurality of activation codes by said activation host to said activation device;

temporarily storing said plurality of activation codes in said activation device;

executing a purchase transaction wherein the asset owner purchases an asset from the distributor;

engaging the medium representing the asset of the purchase transaction with the activation device;

dispensing a unique activation code on the medium;

requesting activation of the asset by the asset owner communicating with the activation host;

comparing information from said medium having the asset ID and the activation code thereon to determine whether the asset can be activated; and transmitting a message indicating approval or disapproval of activation of the asset;

determining an average number of asset purchase transactions occurring at a distributor site for a given period of time in the activation database;

recording the number of asset purchase transactions occurring at the distributor site for the given time period in the activation database;

determining a threshold value of maximum asset purchase transactions allowable at the distributor site for the given period of time;

monitoring the asset purchase transactions at the distributor site to determine if an excess number of asset purchase transactions have occurred; and transmitting a message from said activation host to the distributor via the activation devices indicating approval or disapproval of an asset purchase transaction based upon comparison of the recorded number of asset purchase transactions and the value of maximum asset purchase transactions allowable.

32. A method of activating an asset purchased by an asset owner from a distributor, said method comprising the steps of:

providing an activation host including a centralized computer and an activation database;

creating and storing a plurality of data records in said activation database, said data records including a plurality of account records, each account record corresponding to a unique asset, said data records further including a plurality of activation codes;

providing a medium as a tangible representation of the asset;

placing an asset ID on the medium, each medium having a unique asset ID;

distributing the medium to the distributor;

providing at least cone activation device for each distributor, said activation device communicating with said activation host;

electronically transferring a plurality of activation codes by said activation host to said activation device;

temporarily storing said plurality of activation codes in said activation device;

executing a purchase transaction wherein the asset owner purchases an asset the distributor;

engaging the medium representing the asset of the purchase transaction with the activation device;

dispensing a unique activation code on the medium;

requesting activation of the asset by the asset owner communicating with the activation host;

comparing information from said medium having the asset ID and the activation code thereon to determine whether the asset can be activated; and transmitting a message indicating approval or disapproval of activation of the asset;

determining an average number of asset purchase transactions occurring at each activation device for a given period of time;

recording said average number for each activation device in the activation database;

monitoring the asset purchase transactions occurring at each activation device by said activation host to determine if an excess number of asset purchase transactions have occurred at a particular activation device; and transmitting a message from said activation host to the activation device locking out the activation device from dispensing activation codes when an excess number of asset purchase transactions have occurred.

33. A method of activating an asset purchased by an asset owner from a distributor, said method comprising the steps of:

providing an activation host including a centralized computer and an activation database;

creating and storing a plurality of data records, said data records including a plurality of account records, each account record corresponding to a unique asset to be distributed by the distributor, and sold to an asset owner, said data records further including a plurality of activation codes, each activation code of said plurality of activation codes corresponding to a unique account record of said plurality of account records;

providing a physical medium as a tangible representation of the asset;

placing an asset ID on the medium, each medium having a unique asset ID, each asset ID placed on each medium corresponding to a unique account record in said plurality of account records;

distributing the medium to the distributor;

transferring a plurality of activation codes to the distributor;

enabling the plurality of activation codes by the distributor contacting the activation host, and said activation host confirming the distributor has received the intended plurality of activation codes;

executing a purchase transaction wherein the asset owner purchases an asset from the distributor;

placing an activation code on the medium by engaging the medium with the activation device;

providing a processing device remote from said activation host for processing activation requests by electronic communications with said activation host;

requesting activation of the asset by the asset owner using the processing device which electronically communicates with the activation host;

comparing information from said medium having the asset ID and the activation code thereon to determine whether the asset is authorized for activation; and transmitting a message to the asset owner indicating approval or disapproval of activation of the asset.

34. A method, as claimed in claim 33, further including the step of:

transmitting the current value of the asset during said transmitting step.

* * * * *

UNITED STATES PATENT AND TRADEMARK OFFICE
CERTIFICATE OF CORRECTION

PATENT NO. : 6,829,596 B1  
DATED : December 7, 2004  
INVENTOR(S) : Steve Frazee It is certified that error appears in the above-identified patent and that said Letters Patent is hereby corrected as shown below:

Column 23,  
Line 10, please delete "as set" and replace with -- asset -- therein.

Column 24,  
Line 18, please delete "ID a" and replace with -- IDs -- therein.

Column 25,  
Line 66, please delete "providers" and replace with -- provider's -- therein.

Column 27,  
Line 53, please delete "cone" and replace with -- one -- therein.  
Line 61, after "asset" please insert -- from -- therein.

Signed and Sealed this

Fifteenth Day of February, 2005

JON W. DUDAS  
*Director of the United States Patent and Trademark Office*